(12) United States Patent
Vijendra et al.

(10) Patent No.: US 10,311,019 B1
(45) Date of Patent: Jun. 4, 2019

(54) DISTRIBUTED ARCHITECTURE MODEL AND MANAGEMENT

(75) Inventors: Sudhir Vijendra, Cambridge, MA (US); Patricia G. S. Florissi, Briarcliff Manor, NY (US)

(73) Assignee: EMC IP Holding Company LLC, Hopkinton, MA (US)

(*) Notice: Subject to any disclaimer, the term of this patent is extended or adjusted under 35 U.S.C. 154(b) by 303 days.

(21) Appl. No.: 13/435,009

(22) Filed: Mar. 30, 2012

Related U.S. Application Data

(60) Provisional application No. 61/578,757, filed on Dec. 21, 2011.

(51) Int. Cl.
*G06F 16/00* (2019.01)

(52) U.S. Cl.
CPC .................................. *G06F 16/00* (2019.01)

(58) Field of Classification Search
CPC ............ G06F 11/3466; G06F 11/2257; G06F 11/2273; G06F 2201/86; G06F 17/30327; G06F 17/30592; G06F 8/38; G06F 8/45; G06F 9/5072; G06F 11/008; G06F 17/30; G06F 2212/163; G06F 2212/461
USPC ........ 345/440; 707/600, 791, 792, 794, 790; 715/200; 703/22
See application file for complete search history.

(56) References Cited

U.S. PATENT DOCUMENTS

| | | | |
|---|---|---|---|
| 6,249,755 B1* | 6/2001 | Yemini et al. | 702/183 |
| 8,364,723 B1* | 1/2013 | Hseush et al. | 707/803 |
| 8,819,106 B1* | 8/2014 | Sirota et al. | 709/201 |
| 2002/0178252 A1* | 11/2002 | Balabhadrapatruni et al. | 709/223 |
| 2003/0145305 A1* | 7/2003 | Ruggier | 717/100 |
| 2005/0068953 A1* | 3/2005 | Benjamin | 370/389 |
| 2005/0071681 A1* | 3/2005 | Benjamin | 713/201 |
| 2006/0129998 A1* | 6/2006 | Florissi et al. | 717/127 |
| 2006/0167672 A1* | 7/2006 | Goldman et al. | 703/13 |
| 2006/0179348 A1* | 8/2006 | Florissi et al. | 714/30 |
| 2009/0012993 A1* | 1/2009 | Conn et al. | 707/103 R |
| 2009/0150431 A1* | 6/2009 | Schmidt et al. | 707/103 R |
| 2009/0248431 A1* | 10/2009 | Schoknecht et al. | 705/1 |
| 2010/0083212 A1* | 4/2010 | Fritzsche et al. | 717/104 |
| 2010/0309812 A1* | 12/2010 | Galan Marquez | H04L 41/0806 370/254 |

OTHER PUBLICATIONS

Hedlund, B., Understanding Hadoop Clusters and the Network, Sep. 10, 2011, http://bradhedlund.com/2011/09/10/understanding-hadoop-clusters-and-the-network/.*

Dikaiakos, M.D., Katsaros, D., Vakali, A., (eds) Cloud Computing, IEEE Internet Computing vol. 13, No. 5, 2009.*

(Continued)

*Primary Examiner* — Brian S Cook

(74) *Attorney, Agent, or Firm* — Krishnendu Gupta; David Kuznick

(57) ABSTRACT

A method, apparatus and computer program product including determining a set of objects to be represented in a computer model, determining the relationships between the object to be represented in the computer model, creating representations in the computer model of the set of objects and relationships between the objects, the representations including big data architecture representations and role representations, and where analysis may be performed on the representations of the computer model.

18 Claims, 32 Drawing Sheets

(56) References Cited

OTHER PUBLICATIONS

Hedlund, B., Hadoop Network Design Challenges, Nov. 5, 2011, http://bradhedlund.com/2011/11/05/hadoop-network-design-challenge/.*
Truyen, F., The Fast Guide to Model Driven Architecture: The Basics of Model Driven Architecture, Cephas Consulting Corp., 2006.*
Miller, J., Mukerji, J., (eds) MDA Guide Version 1.0.1 OMG/2003-06-01.*
Musings on Technology, Thursday May 6, 2010, Musings-on-technology.blogspot.com/2008/06/graphical-model-transformation.html.*
Mazon, J., Trujillo, J., A Hybrid Model Driven Development Framework for the Multidimensional Modeling of Data Warehouse, SIGMOD Record, Jun. 2009 (vol. 38, No. 2).*
Ambler, S.W., Data Modeling 101, Mar. 5, 2010, http://www.agiledata.org/essays/datamodeling101.html.*
MapReduce Defined, Archived Wikipedia Dated Dec. 4, 2011 downloaded https://en.wikipedia.org/w/index.php?title=MapReduce&oldid=464089600.*
Shvachko, K., The Hadoop Distributed File System, IEEE 2010.*
Hanson, J.J., An Introduction to the Hadoop Distributed File System: Explore HDFS Framework and Subsystems, IBM DeveloperWorks, Feb. 1, 2011.*
Dikaiakos et al. (Sky Computing, IEEE Internet Computing, Sep./Oct. 2009).*
Hedlund (Understanding Hadoop Clusters and the Network).*
Rannannurth 2010 (MapReduce and Hadoop Distributed File System, 2010 University of Buffalo).*
Dikaiakos et al. (Sky Computing, IEEE Internet Computing, Sep./Oct. 2009) hereinafter known as Cloud Computing.*
Dai_2011 (HiTune: Dataflow-Based Performance Analysis for Big Data Cloud, In Proc. USENIX Annual Technical Conference. (USENIXATC) (Portland, OR, Jun. 2011).*
Hedlund (Understanding Hadoop Clusters and the Network Sep. 10, 2011 downloaded from http://bradhedlund.conn/2011/09/10/understanding-hadoop-clusters-and-the-network/ ).*
Yuan Luo, Zhenhua Guo, Yiming Sun, Beth Plale, Judy Qiu, Wilfred W. Li; A Hierarchical Framework for Cross-Domain MapReduce Execution; School of Informatics and Computing, Indiana University, Bloomington, IN, 47405; San Diego Supercomputer Center, University of California, San Diego, La Joila, CA. 92093.

* cited by examiner

US 10,311,019 B1

DISTRIBUTED ARCHITECTURE MODEL AND MANAGEMENT

CROSS-REFERENCE TO RELATED APPLICATIONS

The present application claims the benefit of U.S. Provisional Patent Application No. 61/578,757, filed on Dec. 21, 2011, which is incorporated herein by reference.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

Technical Field

This invention relates to Big Data.

Background

The amount of data in our world has been exploding. Companies capture trillions of bytes of information about their customers, suppliers, and operations, and millions of networked sensors are being embedded in the physical world in devices such as mobile phones and automobiles, sensing, creating, and communicating data. Multimedia and individuals with smartphones and on social network sites will continue to fuel exponential growth. Yet, the impact this growing amount of data will have is unclear.

SUMMARY

A method, apparatus and computer program product comprising determining a set of objects to be represented in a computer model, determining the relationships between the object to be represented in the computer model, creating representations in the computer model of the set of objects and relationships between the objects wherein representations include big data architecture representations and role representations and performing analysis on the representations of the computer model.

DESCRIPTION OF DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
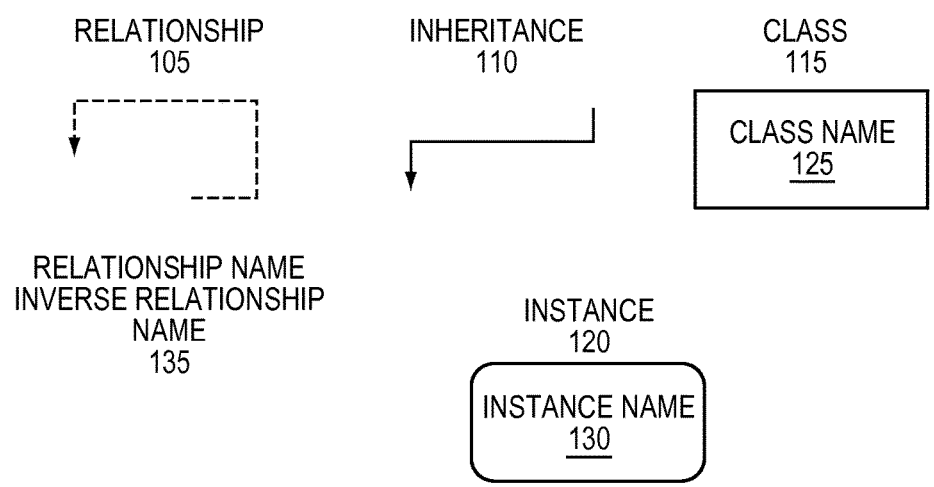
FIG. 1 is a simplified illustration which illustrates sample representations used to describe representations in the model in accordance with an embodiment of the present disclosure.

Generally, the amount of data capture has grown in every area of global economy. Normally, companies are churning out increasing amounts of transactional data, capturing trillions of bytes of information about their customers, suppliers, and operations. Conventionally, millions of networked sensors embedded in the physical world in devices such as mobile phones, smart energy meters, automobiles, and industrial machines create data that is recorded and stored (computed, archived, analyzed . . . ). Usually, as companies and organizations generate a tremendous amount of digital data that are created as a by-product of their activities. Often, enterprises may be collecting data with greater granularity and frequency, capturing every customer transaction, attaching more personal information, and also collecting more information about consumer behavior in many different environments. Usually, this activity increases the need for more storage and analytical capacity.

Typically, social media sites, smartphones, and other consumer devices including PCs and laptops have allowed billions of individuals around the world to contribute to the amount of data available. Normally, consumers communicate, browse, buy, share, and search creating large amounts of consumer data. However, conventional techniques are not able to monitor or analyze this "Big Data." Generally, conventional modeling techniques do not accommodate for or do not model the properties that define Big Data. For example, conventional techniques may not be able to perform analysis on Big Data because of the sheer number and size of transaction that would be necessary to perform the analysis. As well, conventional techniques may consider elements as attributes of the data when, to properly represent the Big Data these "attributes" may need to be considered as properties of the Big Data.

Generally, the Hadoop framework focuses on Massive Parallel Processing (MPP) within the delimiters of a Cluster or data set. Usually, Hadoop assumes that data or Big Data has been transferred to a single cluster and has been evenly distributed across the nodes of the cluster. Typically, Hadoop does not enable analysis of data across multiple clusters. Conventionally, different parts of the Big Data may reside on different clusters potentially spread across different clouds. Usually, a retail enterprise may need to analyze its sales transactions over the last 5 years, but it may store last four years' transactions in a Public Cloud while retaining the last 12 months in its own Private Cloud. Generally, the enterprise does not have the storage, processing capacity or bandwidth, to repatriate the last four years worth of Big Data to its private cloud. In an embodiment, the current disclosure enables management of big data sets where the content may exist across numerous clouds or data storage centers. As used herein, for simplicity, the framework for Massive Parallel Processing (MPP) within the delimiters of a Cluster or data set may be referred to as Hadoop by way of example, however any framework may be used and the current techniques are not limited to use with Hadoop.

Generally, with respect to the data, there may be two architectural frameworks. Conventional architecture design may assume that there are three main types of hardware resources to be managed, servers, enclosing very expensive processors that should not be idle at any moment in time, storage Arrays, enclosing drives of different performance and capacity ranging from Solid State Drive (SSD) to Fiber Channel and SATA, and Storage Area Network (SAN), connecting a set of servers to a set of storage arrays. Generally, this architecture may assumes that most applications are "computing intensive" meaning that there will be high demand for processing power that performs computation on a subset of all the data available for the application, which may be transferred across the SAN to the servers.

Conventionally, a cluster type architecture assumes a flat commodity world, where processing cores and disk drives are cheap and abundant, even though they may and will fail often, applications are computing and data intensive, where computations may need to be done over the entire data set; and in processing Big Data, transfer time becomes the new bottleneck. Traditionally, a Cluster architecture may be based on a set of very simple components and assumes that there are hundreds or thousands of these components together, a node may consist of a set of processing cores attached to a set of disks, a rack may consist of a stack of nodes, and a cluster may consist of a group of racks. Conventionally, within the context of a Cluster, Big Data is typically divided into equal size blocks and the blocks are distributed across the disks in the nodes. Usually, the data in each node may processed by the processing cores in the node providing Data Locality where the data is collocated with the computing node;

Typically, distributed file systems may provide data in a data center to be split between nodes. Generally, a distributed file system may split, scatter, replicate and manage data across the nodes in a data center. Typically, a file system may be a distributed file system when it manages the storage across a network of machines and the files are distributed across several nodes, in the same or different racks or clusters. Conventionally, map reduce may be a computational mechanism to orchestrate the computation by dividing tasks, collecting and re-distributing intermediate results, and managing failures across all nodes in the data center. In certain embodiments, the current techniques may enable data to be split between nodes. In other embodiments, the current techniques may enable computation on data that has been split between nodes.

Conventionally, a distributed file system may a set of equal size blocks. Typically these blocks may be multiples of a simple multiplier, such as 512 kb. Generally, file blocks may be the unit used to distribute parts of a file across disks in nodes. Usually, as disks in a node and nodes in a rack may fail, the same file block may be stored on multiple nodes across the cluster. Typically, the number of copies may be configured. Usually, the Name Node may decide in which disk each one of the copies of each one of the File Blocks may reside and may keep track of all that information in local tables in its local disks. Conventionally, when a node fails, the Name Node may identify the file blocks that have been affected; may retrieve copies of these file blocks from other healthy nodes; may find new nodes to store another copy of them, may store these other copies; and may update this information in its tables. Typically, when an application needs to read a file, may connects to the Name Node to get the addresses for the disk blocks where the file blocks are and the application may then read these blocks directly without going through the Name Node anymore.

In some embodiments, "Big Data" may refer to a dataset that has a size, volume, analytical requirements, or structure demands larger than typical software tools may capture, store, manage, and analyze. In certain embodiments, "Big Data" may refer to a dataset that has a combination of attributes, such as size, volume, structure, or analytical requirements, with which typical software tools may not be able to work. In most embodiments, big data is not defined in terms of being larger than a certain number of terabytes rather, as technology advances over time, the size of datasets that qualify as big data may also increase. In certain embodiments, data transfer speed and no of transactions may also attributes of Big Data.

In further embodiments, the definition of "Big Data" may vary by sector or industry, depending on what kinds of software tools are commonly available and what sizes of datasets are common in a particular industry. Big Data may refer to data from Digital Pathology, data from seismological surveys, data from the financial industry, and other types of data sets that are generally too large, for example in size or number of transactions, to be modeled an analyzed with conventional techniques.

Typically, organizations and business units share IT services, which may result in the creation of Big Data. Generally, the network, apps, and servers are shared and/or dedicated in many instances. Usually, of cloud and Big Data models and analytic platforms provide opportunities for the storage business. However, conventional file sizes vary depending on the verticals, domains and type of data. Conventionally solutions provide a good infrastructure to host files that are large in size, but not for smaller files.

Generally, Big Data is Multi Structured and may be conventionally stored, analyzed and managed each type of information in a number of different ways. In some embodiments, structured data may be stored in Block based, SQL, and RDBMS type databases. In other embodiments, semi-structured data may be stored in XML Data Files, in File Based systems, and in Hadoop Map Reduce. In further embodiments, quasi-structured data may be data containing some inconsistencies in data values and formats, e.g., Web click-stream data. In some embodiments, unstructured data may be text documents that could be subject to analytics over text or numbers such as file based data, Hadoop MapReduce, and HDFS data. In other embodiments, unstructured data may be images and video such as file based data, and data streamlined with technologies such as MapReduce, or Scale Out NAS data. Typically, it may be difficult to process information stored in all different formats, cross-analyze content, or visualize and gain insight into the important information spread all over the different formats.

In some embodiments, World Wide Hadoop (WWH) or other big data processing methodologies may enable Massive Parallel Processing (MPP) to be executed across multiple clusters, and clouds without requiring one or more Big Data sets to be located at the same location. In certain embodiments, WWH may consist of a layer of orchestration on top of Hadoop or a similar architecture that manages the flow of operations across clusters of nodes. In other embodiments, the clusters maybe separate across metro or worldwide distances. In further embodiments, the current techniques may enable World Wide Hadoop (WWH) to enable Genome Wide Analysis (GWA) of Genomes that reside on different Genome Banks, one located in NY and another located in MA.

In certain embodiments, World Wide Hadoop may be applied where big data clouds exist. In certain embodiments, clouds may be extension of the other clouds. In other embodiments, clouds may be an independent cloud. In further embodiments, clouds may be providing an analysis services to other clouds. In some embodiments, the big data clouds may exchange raw data or analyze data for further processing. In certain embodiments, the domain expertise, open data, open science data, analysis etc, may come from different geographic locations and different clouds may host the respective big data. In at least some embodiments, the federation among big data clouds may present an internet infrastructure challenge. In some embodiments, factors like cost and bandwidth limit may affect the big data Hadoop deployment federation. In certain embodiments, the current techniques may model Hadoop environments. In other embodiments, the current techniques may re-define roles of the Hadoop components in the Hadoop clusters. In certain embodiments, Massive Parallel Processing may be enabled across clouds. In some embodiments, WWH concepts apply where there are many big data clouds, and the clouds may need to either exchange raw data or analyze data for further processing. In some embodiments, as used herein, a cluster may be used interchangeably with a data center.

Data Model

In most embodiments a data model or modeling structure may be used to process data across clusters. In most embodiments, the data model may enable representation of multiple data sets. In certain embodiments, this model may include data notes, data clusters, data centers, clouds, and skies.

In most embodiments, the classes, objects, and representations referenced herein may be an extension of known distributed system models, such as the EMC/Smarts Common Information Model (ICIM), or similarly defined or pre-existing CIM-based model and adapted for the environmental distributed system, as will be discussed. EMC and SMARTS are trademarks of EMC Corporation, Inc., having a principle place of business in Hopkinton, Ma, USA. This exemplary model is an extension of the DMTF/SMI model. Model based system representation is discussed in commonly-owned U.S. patent application Ser. No. 11/263,689, filed Nov. 1, 2005, and Ser. No. 11/034,192, filed Jan. 12, 2005 and U.S. Pat. Nos. 5,528,516; 5,661,668; 6,249,755 and 6,868,367, and 7,003,433, the contents of all of which are hereby incorporated by reference. An example of a Big Data Set may be found in commonly-owned U.S. patent application Ser. No. 12/977,680, filed Dec. 23, 2010, entitled "INFORMATION AWARE DIFFERENTIAL STRIPING" the contents of which are hereby incorporated by reference. An example of modeling Big Data Set may be found in commonly-owned U.S. patent application Ser. No. 13/249,330, filed Sep. 30, 2011, entitled "MODELING BIG DATA" the contents of which are hereby incorporated by reference. An example of analyzing Big Data Set may be found in commonly-owned U.S. patent application Ser. No. 13/249,335, filed Sep. 30, 2011, entitled "ANALYZING BIG DATA" the contents of which are hereby incorporated by reference.

Generally, referred-to US Patents and patent applications disclose modeling of distributed systems by defining a plurality of network configuration non-specific representations of types of components (elements or devices) managed in a network and a plurality of network configuration non-specific representations of relations among the types of managed components and problems and symptoms associated with the components and the relationships. The configuration non-specific representations of components and relationships may be correlated with a specific Big Data set for which the associated managed component problems may propagate through the analyzed system and the symptoms associated with the data set may be detected an analyzed. An analysis of the symptoms detected may be performed to determine the root cause—i.e., the source of the problem—of the observed symptoms. Other analysis, such as impact, fault detection, fault monitoring, performance, congestion, connectivity, interface failure, in addition to root-cause analysis, may similarly be performed based on the model principles described herein.

Refer now to the example embodiment of FIG. 1, which illustrates sample representations used to describe representations in the data model. In the example embodiment of FIG. 1, directional dotted lines 105 may represent relationship from one class or instance to another. In most embodiments, if the dotted line is bi-directional then the inverse relationship needed to traverse the classes may be written next to the relationship name with a '/' sign. In FIG. 1, unidirectional solid line 110 represents the class inheritance. In certain embodiments, the inherited class may be where the arrow in the line ends, and the other class may be the source class. In most embodiments, the inherited class inherits the methods and properties from the source class. In FIG. 1, Class 115 is represented by a solid rectangular box. An instance of a class, such as instance 130, of a class is represented by an non-solid rectangular box.

In most embodiments, a Set may be an abstract class representing entities that have the same properties of the mathematical construct set. In certain embodiments, members of the set class may have a ConsistsOf relationship with other members of this class. In most embodiments, the inverse relationship for ConsistsOf may be MemberOf. In some embodiments, the Class Set may be the root of the WWH management and operational model. In at least some embodiments, the Class Set may define ConsistsOf and MemberOf relationships to itself. In further embodiments, the Class Set abstract class may have many inherited classes. In certain embodiments, the inherited classes may add or override methods, properties and relationships.

Figure 2:
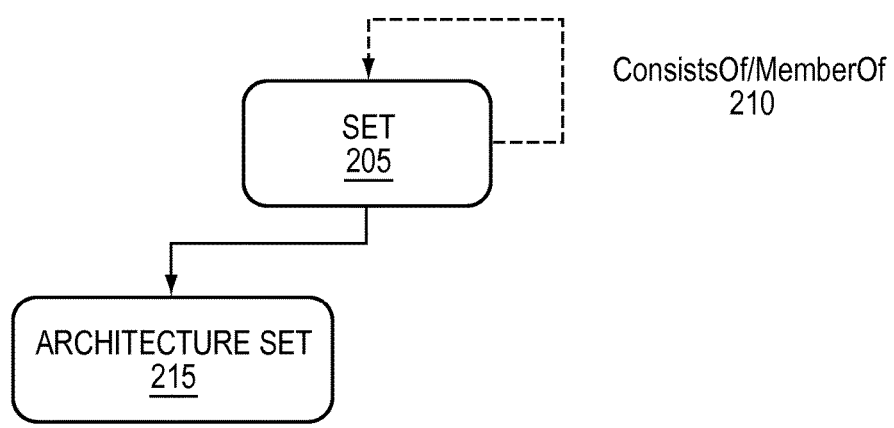
FIG. 2 is a simplified illustration of a represents a set and architecture set in a model for Big Data Architecture, in accordance with an embodiment of the present disclosure.

In certain embodiments, an Architecture Set may be an abstract class representing entities that, in addition to exhibiting the properties of the class Set, describe components of the overall architecture system. In most embodiments, members of the Architecture Set class may have an Underlying relationship with members of the class File Set, which may indicate that the related members of the File Set Class reside (are hosted) or utilize these members of the Architecture Class. For example, refer now to the example embodiment of FIG. 2 which represents a set and architecture set. Architecture set 215 inherits the information of Set 205. Set 205 is a member of itself, set 205.

Figure 3:
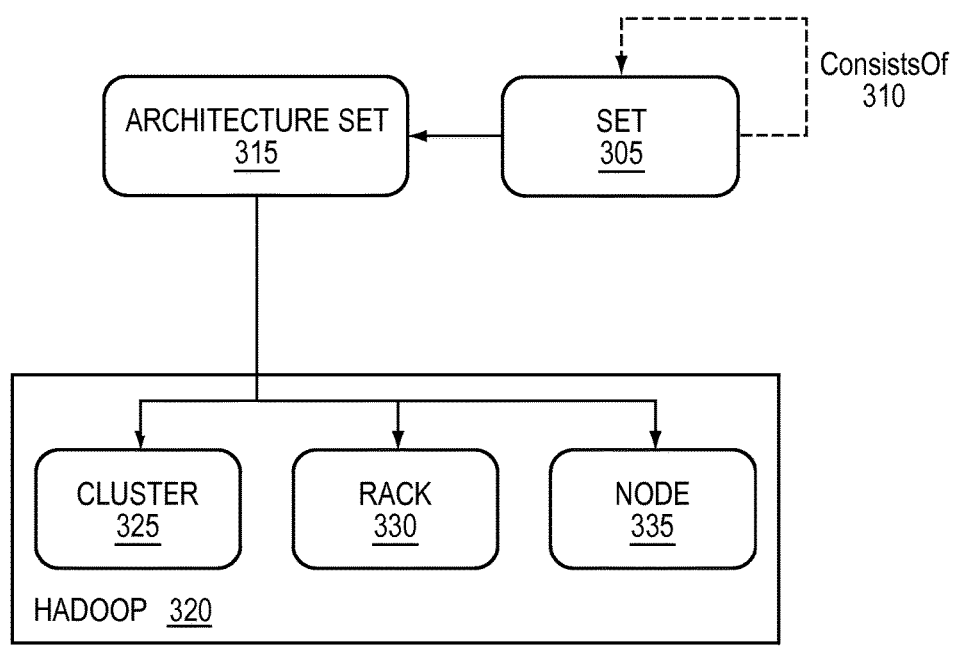
FIG. 3 is a further simplified illustration of a model representation of infrastructure components information for Big Data Architecture, in accordance with an embodiment of the present disclosure.

Refer now to the example embodiment of FIG. 3. In the example embodiment of FIG. 3, Hadoop data set 320 is comprised of cluster 325, rack 330, and note 335. Architecture set 315, which is based on Set 305, manages Hadoop.

Figure 4:
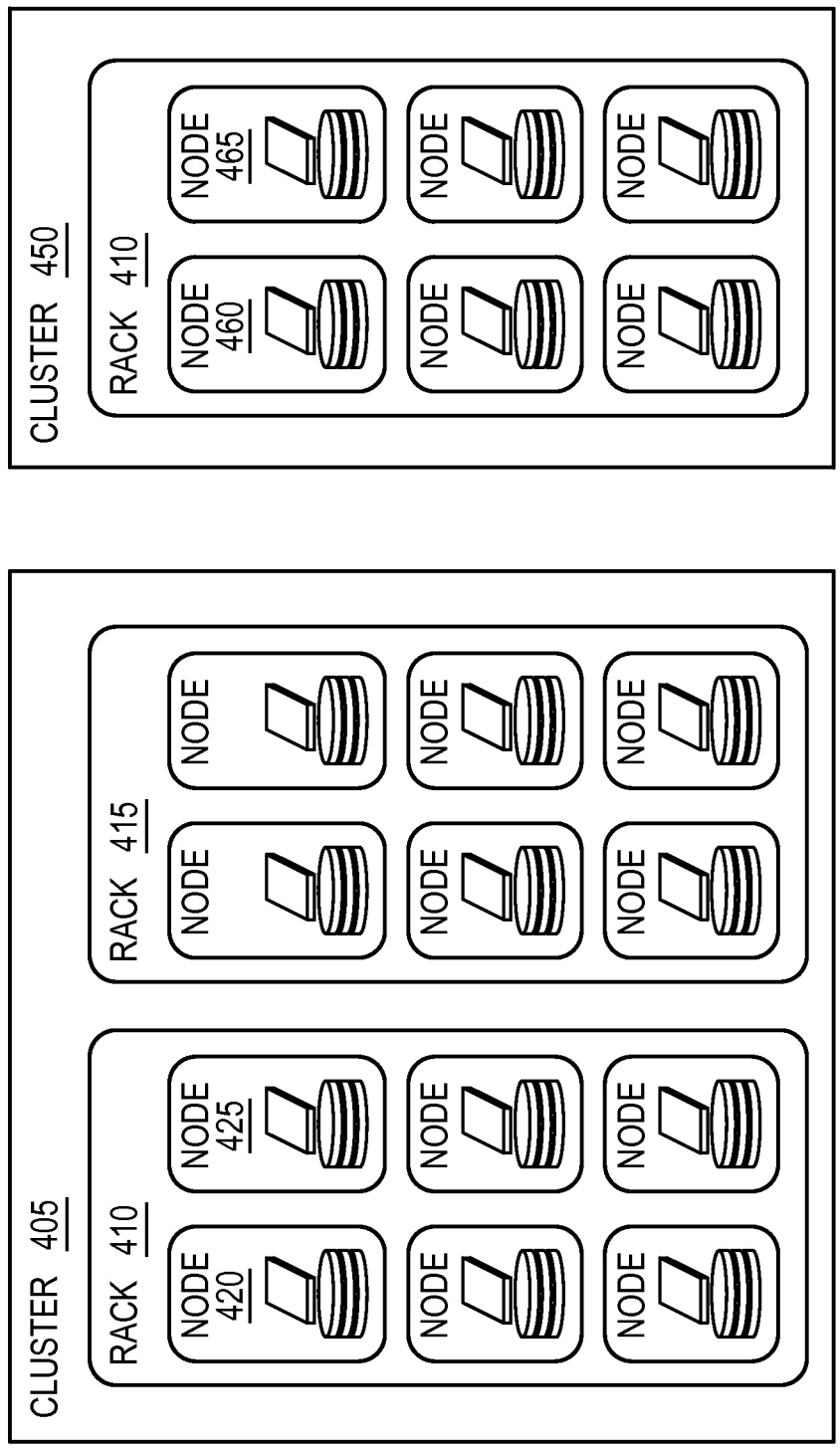
FIG. 4 is a simplified illustration representing clusters, which contain racks, which contains nodes, in accordance with an embodiment of the present disclosure.

Refer now to the example embodiment of FIG. 4, which illustrates clusters, which contain racks, which contains nodes. In FIG. 4, there are two clusters, 405 and 450. These clusters, 405, 450, represent storage capability as grouping of racks, such as Rack 410 and 415 for cluster 405. Each rack, such as rack 410, 415, and 455, is in turn made of nodes such as node 420 and 425 for rack 410.

In certain embodiments, the Architecture Set class may manage a Hadoop cluster. In certain embodiments, a Hadoop cluster may belong to a Data Center, and in each Data Center there may be many Racks and Nodes. One Rack may consist of many Nodes hosted within it. In some embodiments, classes DataCenter or Cluster, Rack and Node may derived from the class ArchitectureSet.

In certain embodiments, an Architecture Set class may manages a Hadoop cluster. In most embodiments, an Hadoop cluster may belong to a Data Center, and in each Data Center may have many Racks and Nodes, such as the embodiment shown in FIG. 3. In certain embodiments, one rack may consists of many Nodes hosted by it. In most embodiments, these items may be represented by classes. In certain embodiments, Classes DataCenter, Rack and Node may be derived from the class ArchitectureSet.

Figure 5:
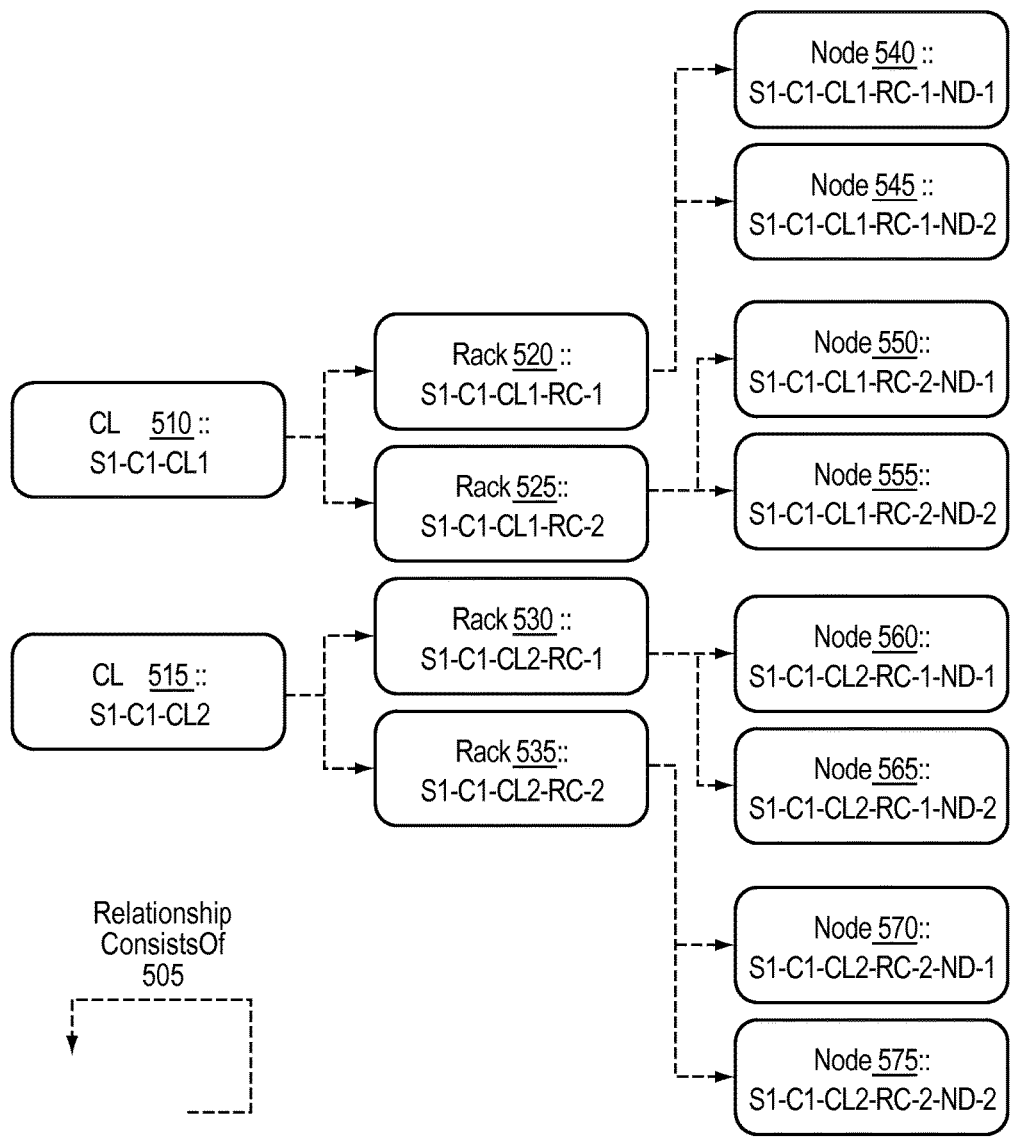
FIG. 5 is a simplified illustration representing a sample topology of clusters, racks and notes, in accordance with an embodiment of the present disclosure.

Refer now to the example embodiment of FIG. 5, illustrating a sample topology of clusters, racks and notes. The example embodiment of FIG. 5 represents two clusters, 510 and 515, each which consists of two racks, rack 520, 525, and 530 and 535, respectively. In turn, each rack such as rack 520, consists of 505 two nodes, such as node 540, 545. The relationship between the items in FIG. 5 may be traversed by the ConsistsOf relationships.

Figure 6:
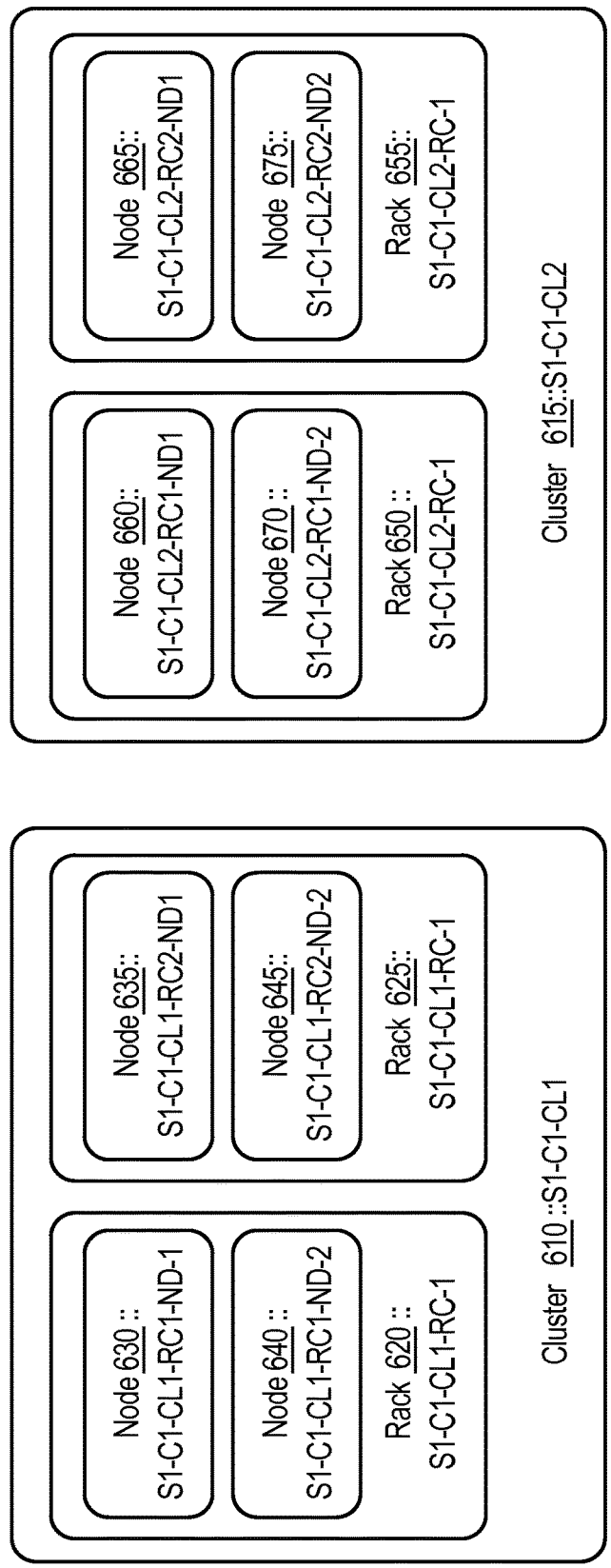
FIG. 6 is a simplified illustration representing an alternative expression of the topology of FIG. 5, in accordance with an embodiment of the present disclosure.

Refer now to the example embodiment of FIG. 6, which represents an alternative expression of the topology of FIG. 5. In the example embodiment of FIG. 6, each cluster, 610, 615, consists of two racks, 620, 625 and 650, 655 respectively. Each rack, such as rack 620, consists of a number of nodes, such as nodes 630, 640. In certain embodiments, a WWH dashboard or a management station may represent the topology as illustrated in FIG. 6 based on the modeling information. FIG. 6 may also represent a dashboard that may be used in a big data center management station.

In some embodiments, a Cloud may represent a Collection of Data Centers in the same physical location. In at least some embodiments, a sky may represent a collection of Clouds and of other Skies (allowing for recursion). In certain embodiments, a Virtual Machine may be members of or make up a Node. In most embodiments, the Cloud and Sky classes may be derived from Architecture Set class. In certain embodiments, the Sky class may be a collection of Cloud classes, and the Cloud class may be a collection of Data Center classes in the same location. In most embodiments, the Sky may connect different Hadoop locations and may facilitate federation functions.

Figure 7:
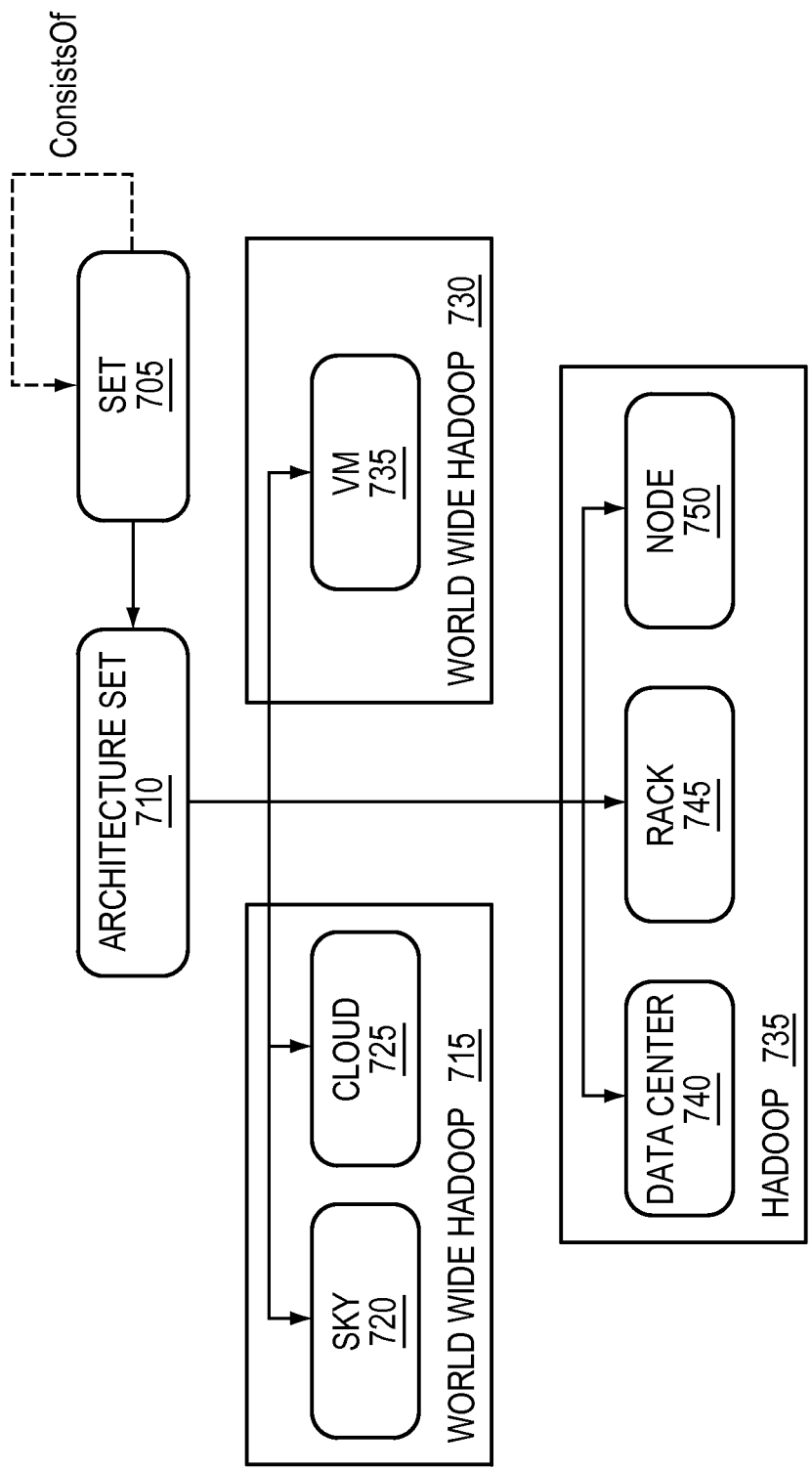
FIG. 7 is a simplified illustration representing a topology of objects with world wide hadoop, hadoop, and virtualized hadoop, in accordance with an embodiment of the present disclosure.

Refer now to the example embodiment of FIG. 7, which represents a topology of objects with world wide hadoop, hadoop, and virtualized hadoop. In the example embodiment of FIG. 7, Architecture set 710 is derived from set 705, which is composed of itself, set 705. World Wide Hadoop 715 is represented by Sky 720 and Cloud 725. Sky 720 and Cloud 725 are derived from architecture set 710. Virtualized Hadoop has Virtual Machine (VM) 735. VM 735 is derived from Architecture set 710. Hadoop 735 contains data center 740, rack 745, and node 750. Data center 740, rack 745, and node 750 are derived from architecture 710. In certain embodiments, in virtualized Hadoop clusters, the nodes may run the VMs on the ESX servers.

Figure 8:
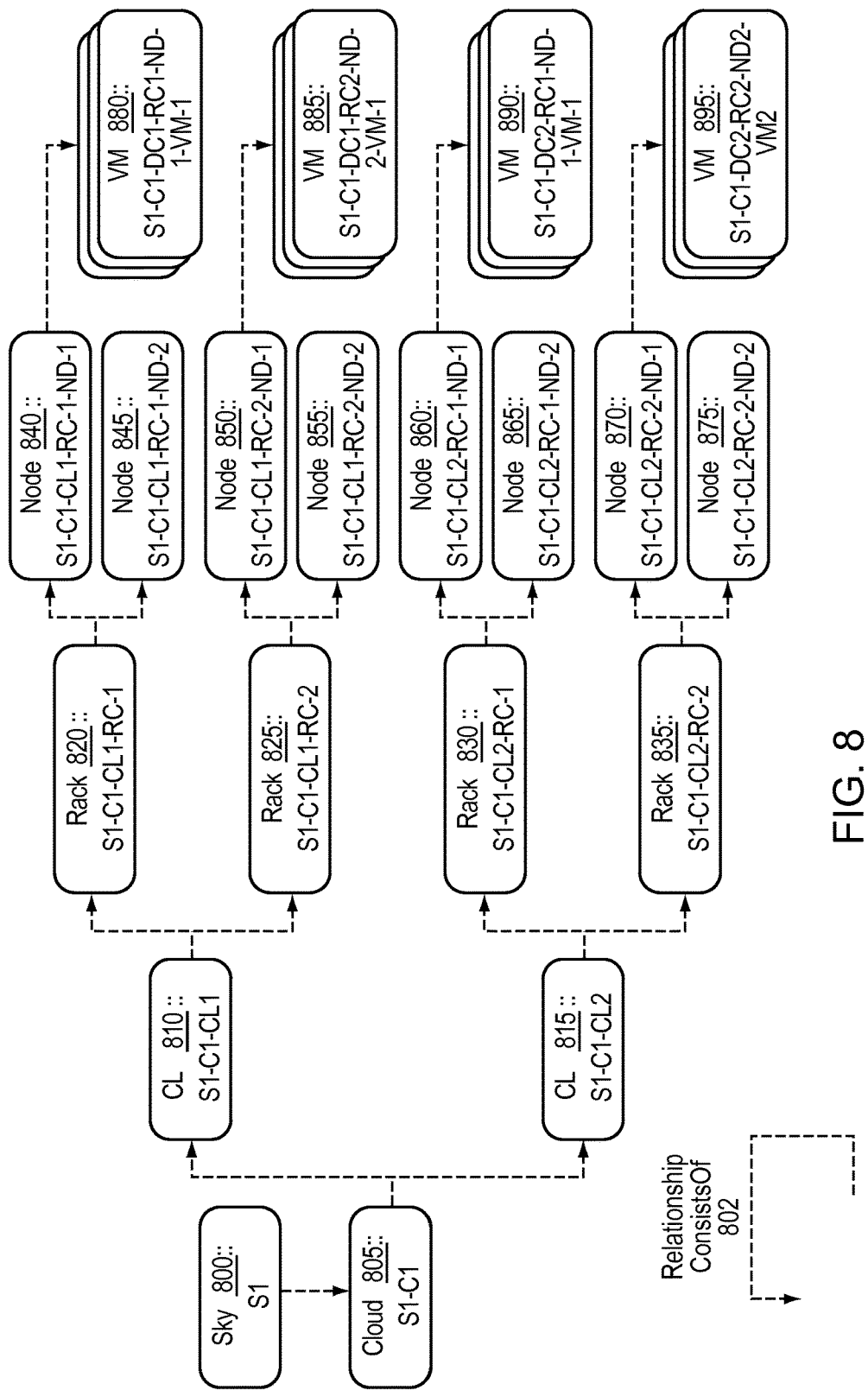
FIG. 8 is a simplified illustration representing a sample topology including a sky and cloud, in accordance with an embodiment of the present disclosure.

Refer now to the example embodiment of FIG. 8, which illustrates a sample topology including a sky and cloud. In the example embodiment of FIG. 8, Sky 800 has Cloud 805. Cloud 805 is composed of Clusters 810 and 815. Clusters, 810 and 815, comprise of two racks, rack 820, 825, and 830 and 835, respectively. In turn, each rack such as rack 820, consists of 805 two nodes, such as node 840, 845. The relationship between the items in FIG. 8 may be traversed by the ConsistsOf relationships.

Figure 9:
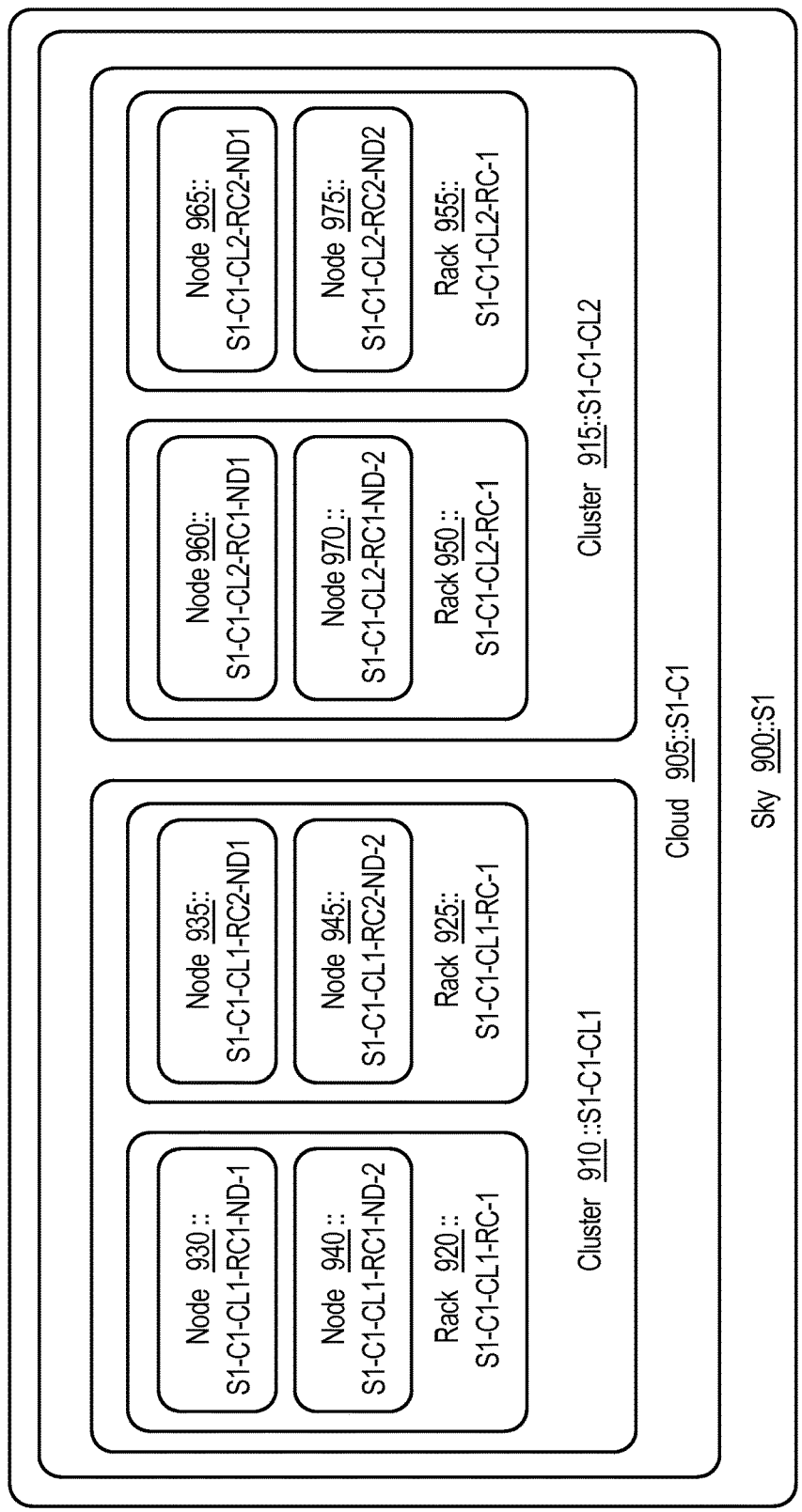
FIG. 9 is a simplified illustration representing an alternative expression of the topology of FIG. 8, in accordance with an embodiment of the present disclosure.

Refer now to the example embodiment of FIG. 9, which represents an alternative expression of the topology of FIG. 8. In the example embodiment of FIG. 9, Sky 900 has cloud 905. Cloud 905 in turn has clusters 910 and 915. Clusters 910, 915, consist of two racks, 920, 925 and 950, 955 respectively. Each rack, such as rack 620, consists of one or more nodes, such as nodes 930, 940. In certain embodiments, a WWH dashboard or a management station may represent the topology as illustrated in FIG. 9 based on the modeling information.

In certain embodiments, a node may be composed of several elements, which may be represented as classes within a model. In some embodiments, a node may have a processor an element that delivers CPU Cycles or processing power. In at least some embodiments, a node may have storage, which may be an element that stores data. In most embodiments, a node may have a block, which may be the components of storage that may be addressed individually. In some embodiments, the class component may be an extension of (derived from) class Node. In certain embodiments, node components may consists of sub-classes Processor, Storage and Blocks, which may extend the management layers into compute and storage abstractions. In some embodiments, a class representing a collection of storage blocks that may be addressed and handled as a single entity may be a File.

Figure 10:
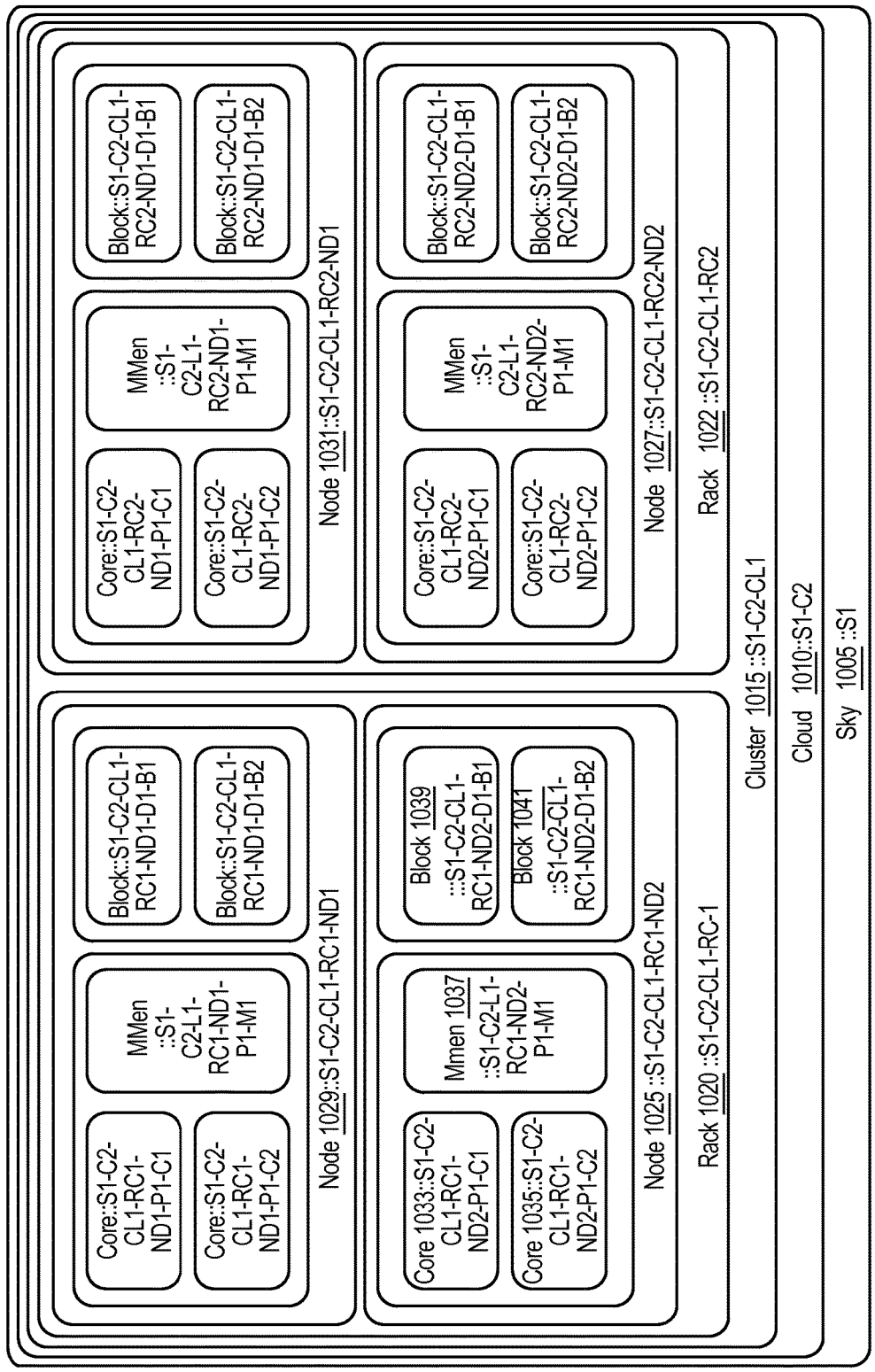
FIG. 10 is a simplified illustration representing illustrates an example display of a topology, in accordance with an embodiment of the present disclosure.

Refer now to the example embodiment of FIG. 10, which illustrates an example display of a topology. In the example embodiment of FIG. 10, Sky 1005 has Cloud 1010. Cloud 1010 in turn has Cluster 1015. Cluster 1015 has two racks, Rack 1020 and Rack 1022. Racks 1020 and Rack 1022 have nodes. Rack 1020 has Nodes 1025 and 1029. Node 1025 is composed of Cores 1022 and 1025. Node 1025 also has memory 1037 and Blocks 1039 and 1041.

Figure 11:
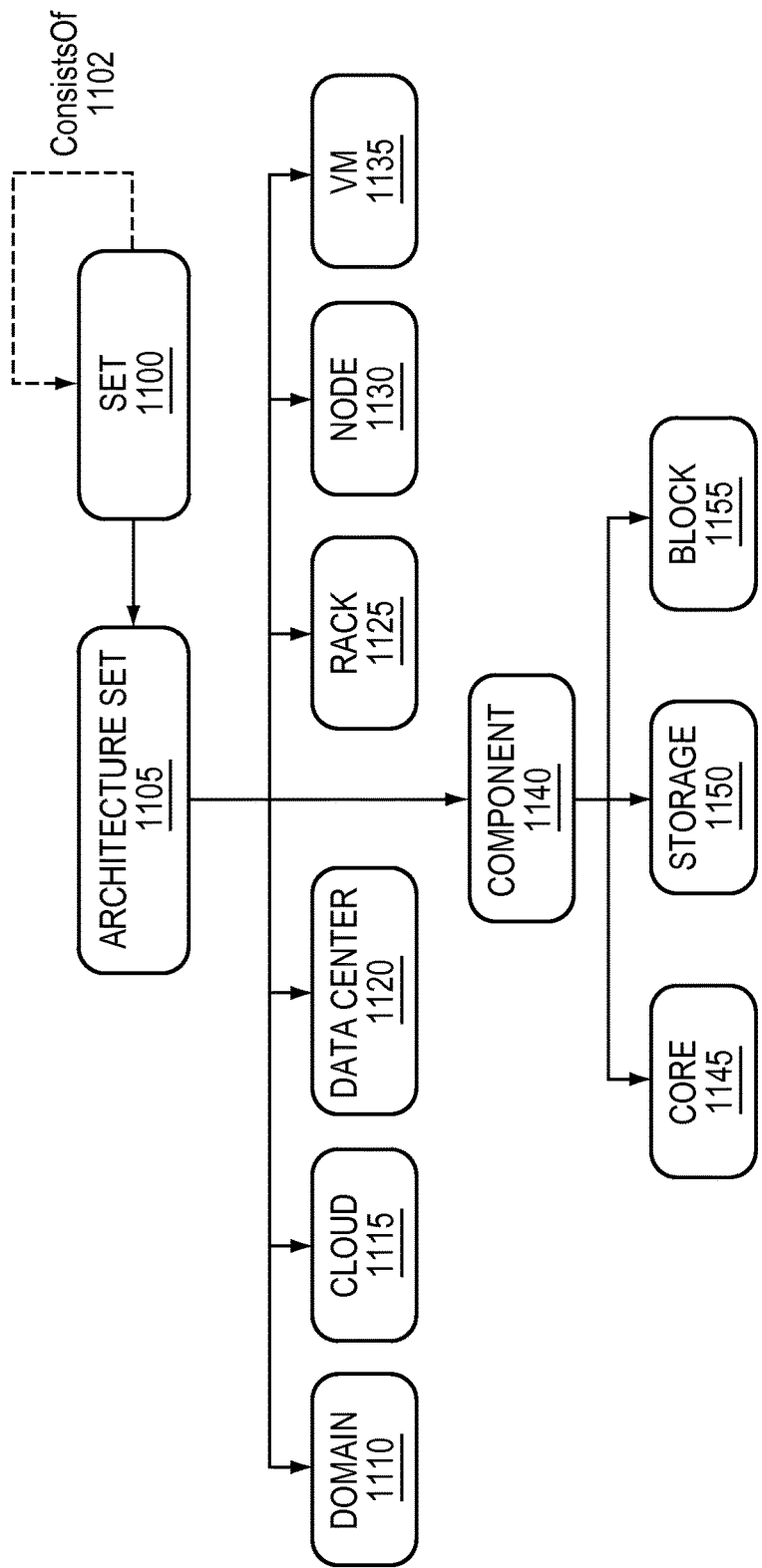
FIG. 11 is a simplified illustration representing a modeling structure, in accordance with an embodiment of the present disclosure.

Refer now to the example embodiment of FIG. 11, which illustrates a modeling structure. Architecture set 105 inherits set 1100. Domain 1110 inherits Architecture set 1105. Cloud 1115 inherits Architecture set 1105. Data Center 1120 inherits Architecture set 1105. Rack 1125 inherits Architecture set 1105. Node 1130 inherits Architecture set 1105. VM 1125 inherits Architecture set 1105. Component 1140 inherits Architecture set 1105. Core 1145 inherits Component 1140. Storage 1150 inherits Component 1140. Block 1155 inherits Component 1140.

In certain embodiments, a class representing a collection of storage blocks that may be addressed and handled as a single entity may be a file. In most embodiments, a file may be referred to by a user-defined name and managed by a File System. In certain embodiments a file system may be a class representing a system consisting of a collection of Files. In at least some embodiments, a File System may manage Storage Blocks to provide the abstraction of a File to the end user. In further embodiments, a class representing pieces of File, as managed by the File System may be a File System Block. In at least some embodiments, a File Block may be a multiple of a Storage Block. In alternative embodiments, a class representing a File System that manages Files that have storage blocks which may be spread across a network of nodes, racks or data centers may be a Distributed File System. In some embodiments, a class representing a collection of Files that may be addressed and handled as a single entity may be a domain. In certain embodiments, a domain may be referred by a user-defined name and managed by a File System. In most embodiments, a class representing a File System that manages Domains with Files which may be managed by a Distributed File System may be a World Wide Distributed File System.

Figure 12:
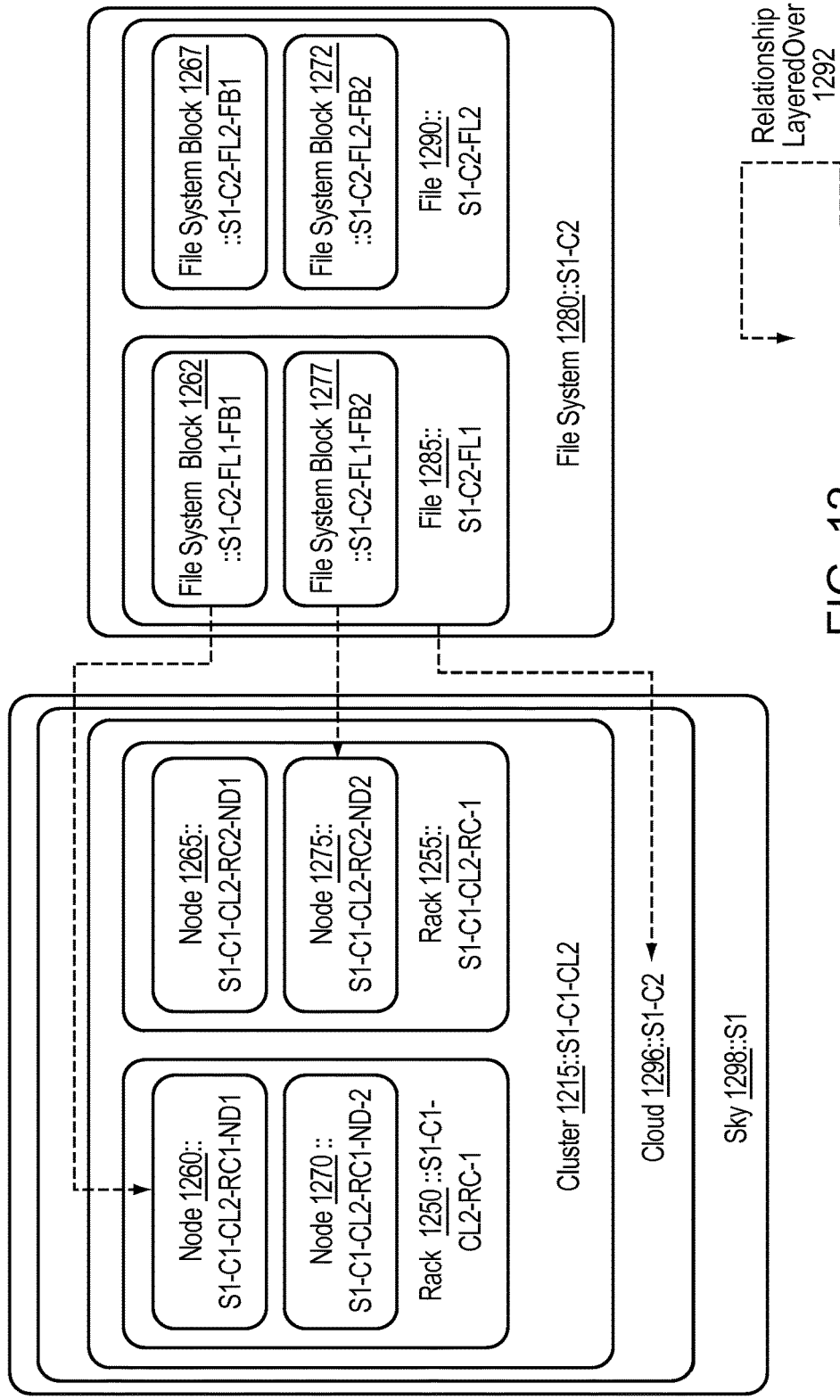
FIG. 12 is a simplified illustration representing a combination of Architecture and File System Abstractions, in accordance with an embodiment of the present disclosure.

Refer now to the example embodiment of FIG. 12, which illustrates a combination of Architecture and File System Abstractions. In the example embodiment of FIG. 12, file system 1280 is layered over 1292 Sky 1298. File system 1280 has file 1285 and file 1290. File 1280 is layered over cloud 1296. File 1285 has file system block 1277 and file system block 1262. File system block 1277 are layered over node 1275 and file system block 1262 is layered over node 1260. The embodiment shows the relationships between a File System and Node.

Figure 13:
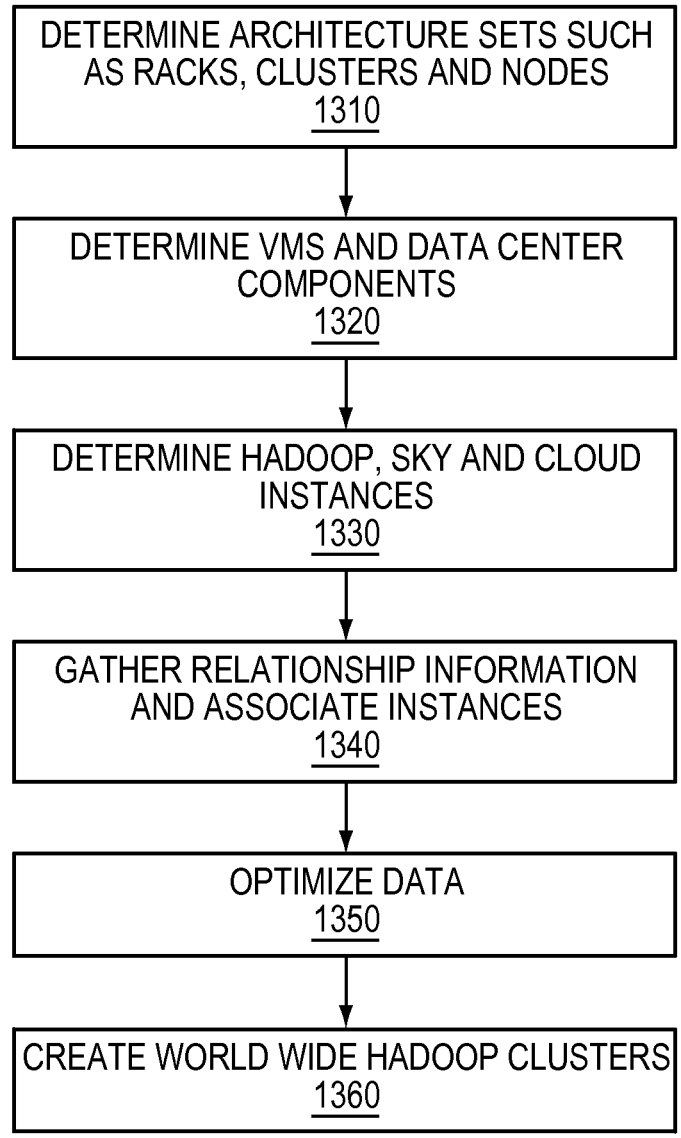
FIG. 13 is a simplified illustration representing simplified method useful for transforming elements of a data set, in accordance with an embodiment of the present disclosure.

Refer now to the example embodiment of FIG. 13. The example embodiment of FIG. 13 may be useful in transforming elements of a data set, such as outlined in FIG. 4, to a model representation such as outlined in FIG. 5. of the Architecture Sets, for a particular system, such as Racks, Clusters and Nodes may be determined (step 1310). VMs and Data Center Components are determined (step 1320). Hadoop, Sky and Cloud instances, for a particular instance may be determined (step 1330). Relationship information and associate instances may be gathered (step 1340). The data may be optimized (step 1350). World Wide Hadoop clusters may be created (step 1360).

Figure 14:
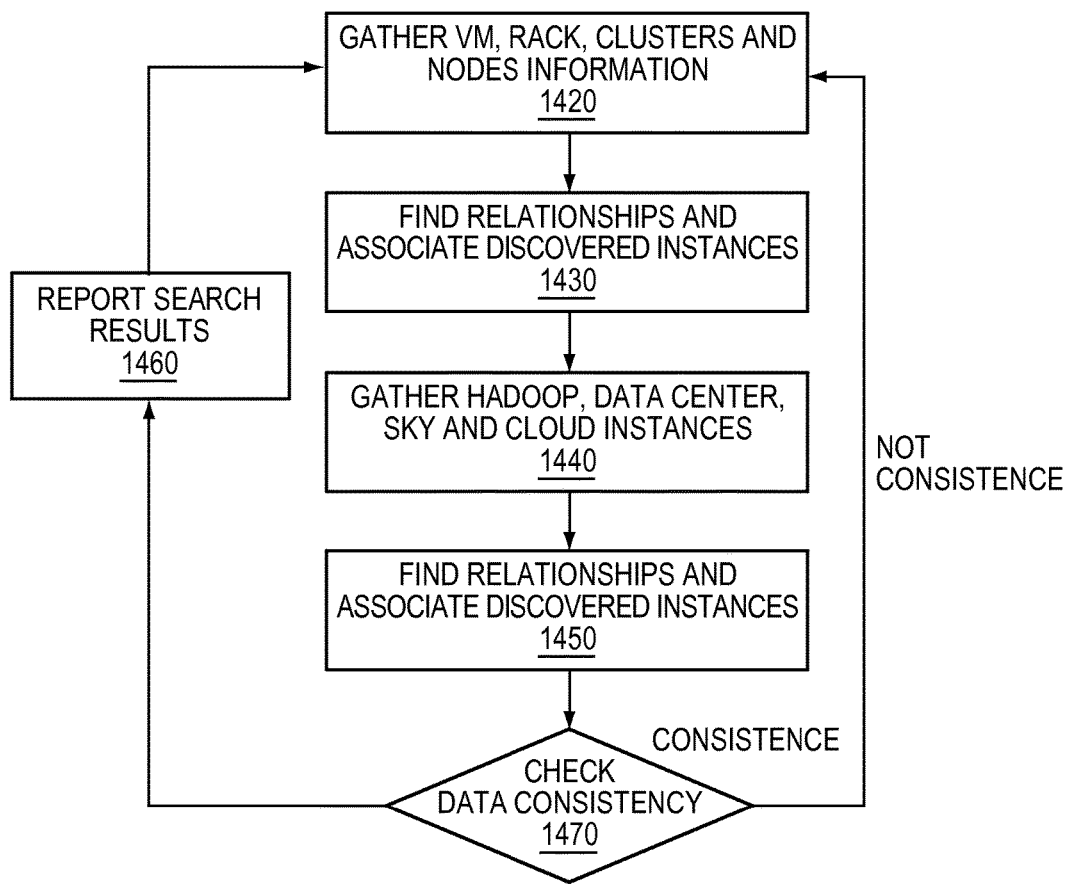
FIG. 14 is an alternative simplified method useful for transforming elements of a data set, in accordance with an embodiment of the present disclosure.

Refer now to the example embodiment of FIG. 14. The example embodiment of FIG. 13 may be useful in transforming elements of a data set, such as outlined in FIG. 4, to a model representation such as outlined in FIG. 5. VM, Rack, Clusters and Nodes Information may be gathered (step 1420). Relationships and associate discovered instances may be discovered (step 1430). Hadoop, Data Center, Sky and Cloud instances may be gathered (step 1440). Relationships and associate discovered instances may be found (step 1450). Search Results may be reported (step 1460). The data consistency may be checked (step 1470). If it is not consistence, steps 1420 to 1470 may be repeated.

In some embodiments, at a higher level (world wide), several Hadoop architectures may be connected via domains, cloud and sky for raw data and analytics data transfer and management. In certain embodiments, each Hadoop architecture may contains compute and storage elements. In at least some embodiments, the storage elements may include File Systems, Files and Blocks. In further embodiments, these may be managed for better indexing, searching and organizing. In particular embodiments, the compute elements, such as Clusters, Racks and Nodes may be modeled and managed for better availability, configuration and performance. In further embodiments, the world wide and at the local Hadoop architecture there may be many compute elements server different purpose. In at least some embodiments, each of the compute nodes may assume a role depending on the application that is run on the server node. In some embodiments, the role may be a Naming (or master) application or Data transfer and management (or slave) application. In alternative embodiments, these nodes may be serving nodes just within the local Hadoop architecture or at the world wide architecture. In certain techniques, the current disclosure enables roles of server nodes and may enable the nodes to be connected back to the WW Hadoop architecture.

In certain embodiments, a master may be an abstract class representing entities that, in addition to exhibiting the properties of the class Role, may exhibit specific functions or responsibilities to become the coordinator, orchestrator and/or leader of an activity. In some embodiments, members of the master class may have a Tracks relationship with members of the class Slave, which may indicate that the related members of the Slave Class may execute functions on behalf of or per instruction from the related Master. In at least some embodiments, a slave class may be an abstract class representing entities that, in addition to exhibiting the properties of the class Roles, may exhibit specific function or responsibilities to become a servant on some activity being led by a Master. In further embodiments, members of the slave class may have a TrackedBy relationship with members of the class Master, indicating that the related members of the Master Class may be the coordinator, orchestrator and/or leader of the overall activity whose Slave may be executing one part of it. In some embodiments, the role classes may transverse relationships and may identify object roles and responsibilities of the programs running on a server, or node.

In certain embodiments, the Name Node or Master node may manage the file system name space. In certain embodiments, the name node may maintain the file system tree. In other embodiments, the name node may manage all the metadata for all files and directories in the tree. In some embodiments, the name node may maintain namespace image and edit log files.

In some embodiments, a Data Node or worker Workers may stores and retrieves blocks upon request. In other embodiments, the data nodes may reports status to Name Node on a periodic basis, indicating the list of blocks that may be stored.

Figure 15:
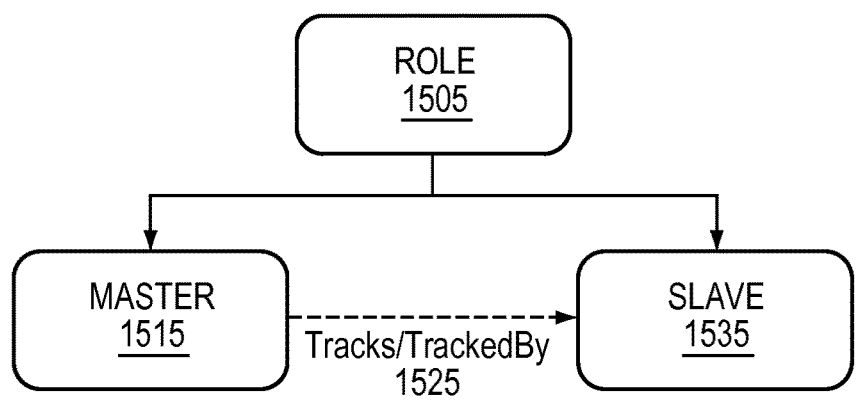
FIG. 15 is a simplified illustration representing master and slave role objects, in accordance with an embodiment of the present disclosure.

Refer now to the example embodiment of FIG. 15. In this example, role 1505 is the parent class to Master 1515 and to Slave 1535. Slave 1535 is tracked 1525 by Master 1515. Refer now to the example embodiment of FIG. 16, which overlays FIG. 15 onto Hadoop Distributed File System 1635. Name node 1625 extends Master Node 1610. Data Node 1630 extends Slave 1620.

Figure 17:
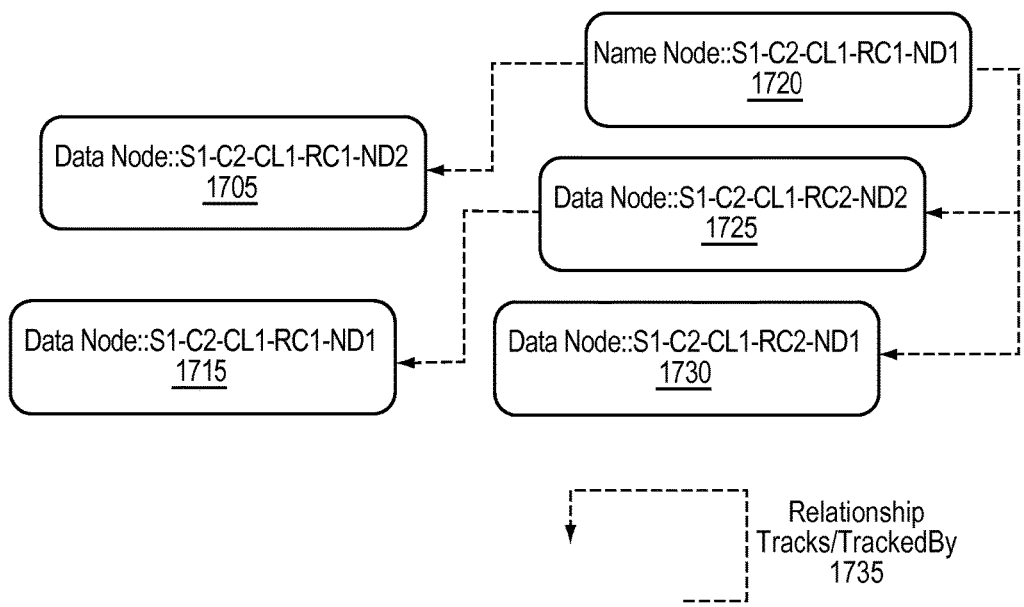
FIG. 17 is a simplified illustration representing relationships between name nodes and data nodes, in accordance with an embodiment of the present disclosure.

Refer now to the example embodiment of FIG. 17, which illustrates an example embodiment of the relationships between name nodes and data nodes. Data node 1705 is tracked by 1735 name node 1720. Data node 1715 is tracked by 1735 data node 1725.

In further embodiments, the data node may have a relationship and its Inverse Assumed By represent the different roles taken by the different architectural components. In certain embodiments, a relationship may assume between and a instance of the class architecture and an instance of the class Role indicate that the instance of the Architecture class is executing the functions associated with the related instance of the class Role.

Figure 18:
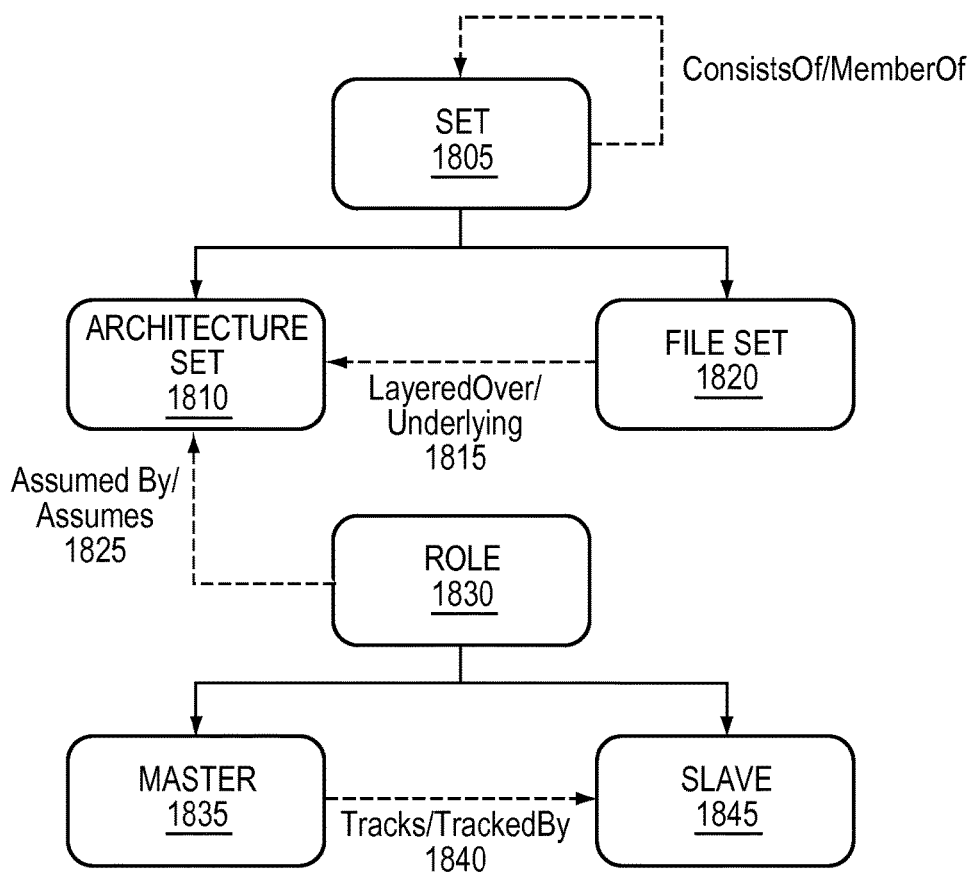
FIG. 18 is a simplified illustration representing sets, architecture sets and file sets, in accordance with an embodiment of the present disclosure.
Figure 19:
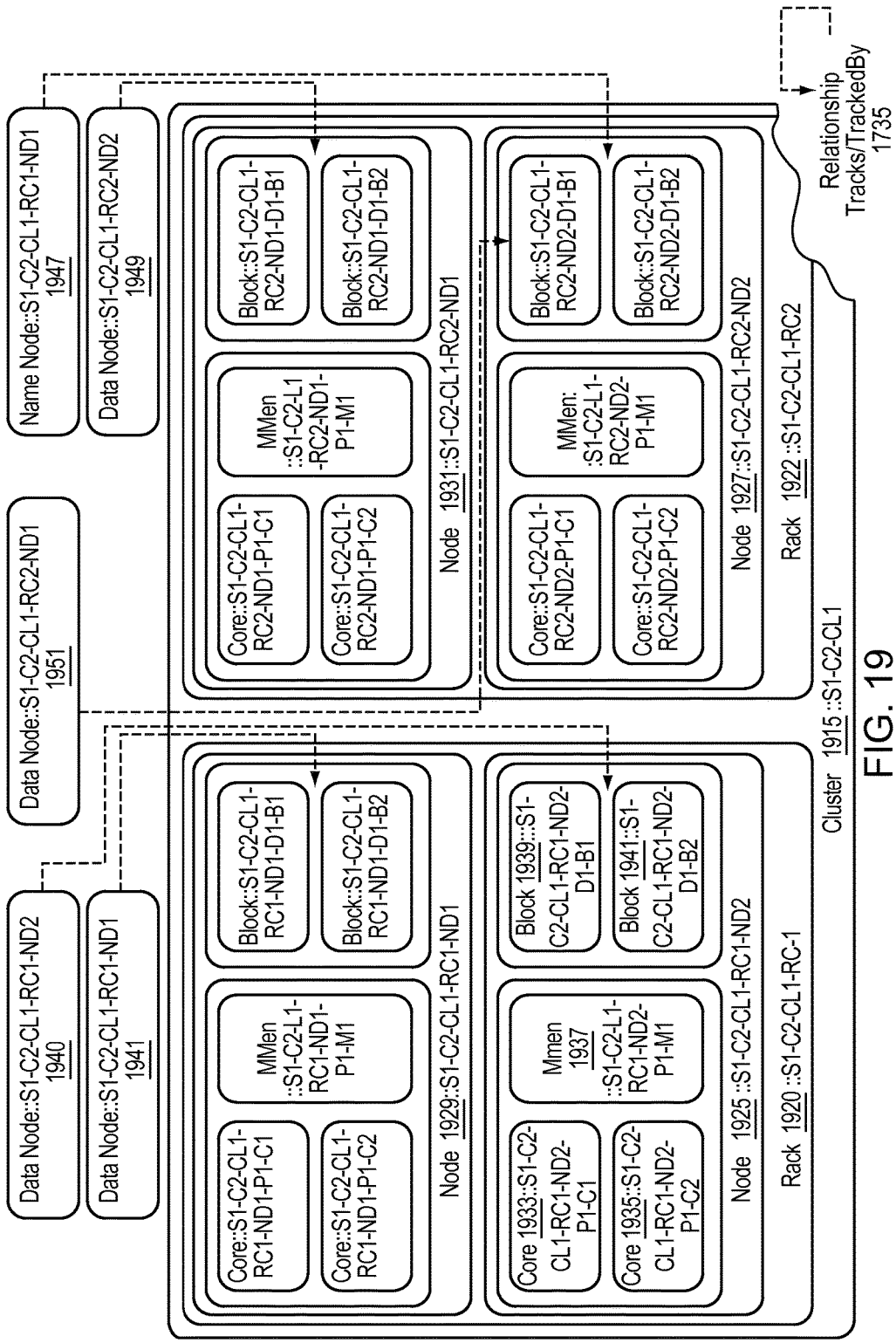
FIG. 19 is a simplified illustration representing data nodes and mapping from blocks to nodes, in accordance with an embodiment of the present disclosure.

Refer now to the example embodiment of FIG. 18. Set 1805 consists of itself. Architecture set 1810 and file set 1820 are derived from set 1805. Architecture set is layered over 1815 File set 1820. Architecture set 1810 is Assumed by Role 1830. Master 1835 and slave 1845 are derived from Role 1830. Slave 1845 is tracked by 1840 Master 1835. Refer now to the example embodiment of FIG. 19. In this embodiment, Data nodes 1940, 1941, 1947, 1949, and 1951 are mapped to blocks on nodes 1929, 1925, 1931, and 1927.

Figure 20:
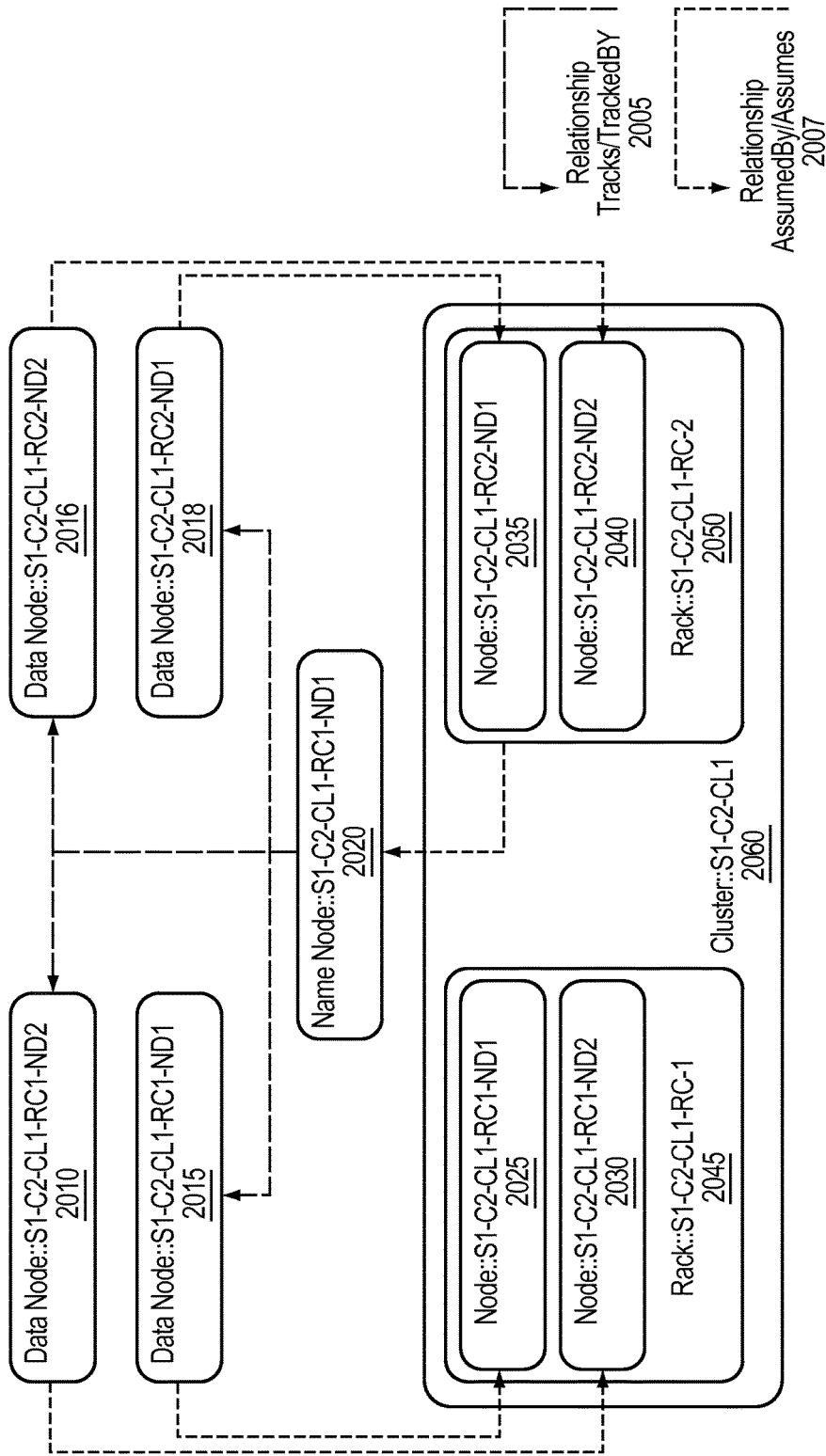
FIG. 20 is a simplified illustration representing relationships between role and architecture, in accordance with an embodiment of the present disclosure.
Figure 21:
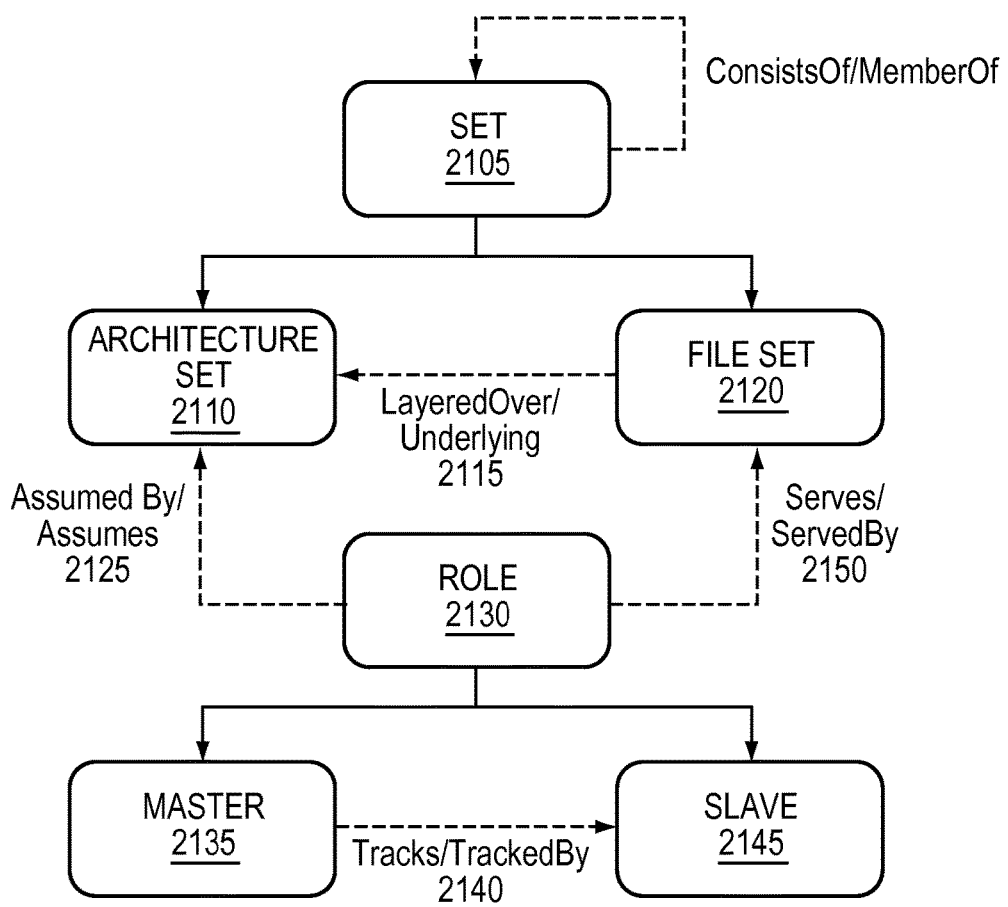
FIG. 21 is a simplified illustration representing FIG. 18 expanded to have role served by file set, in accordance with an embodiment of the present disclosure.

Refer now to the example embodiment of FIG. 20, which illustrates relationships between role and architecture. Data nodes 2010, 2015, 2016, and 2018 are tracked by 2005 Name node 2020. Data nodes 2010 and 2015 are assumed by 2007 nodes 2025 and 2030 respectively. Node 2035 is assumed by 2007 name node 2020. Refer now to the example embodiment of FIG. 21, which expands FIG. 18 to have role 2130 served by 2150 file set 2120.

Figure 22:
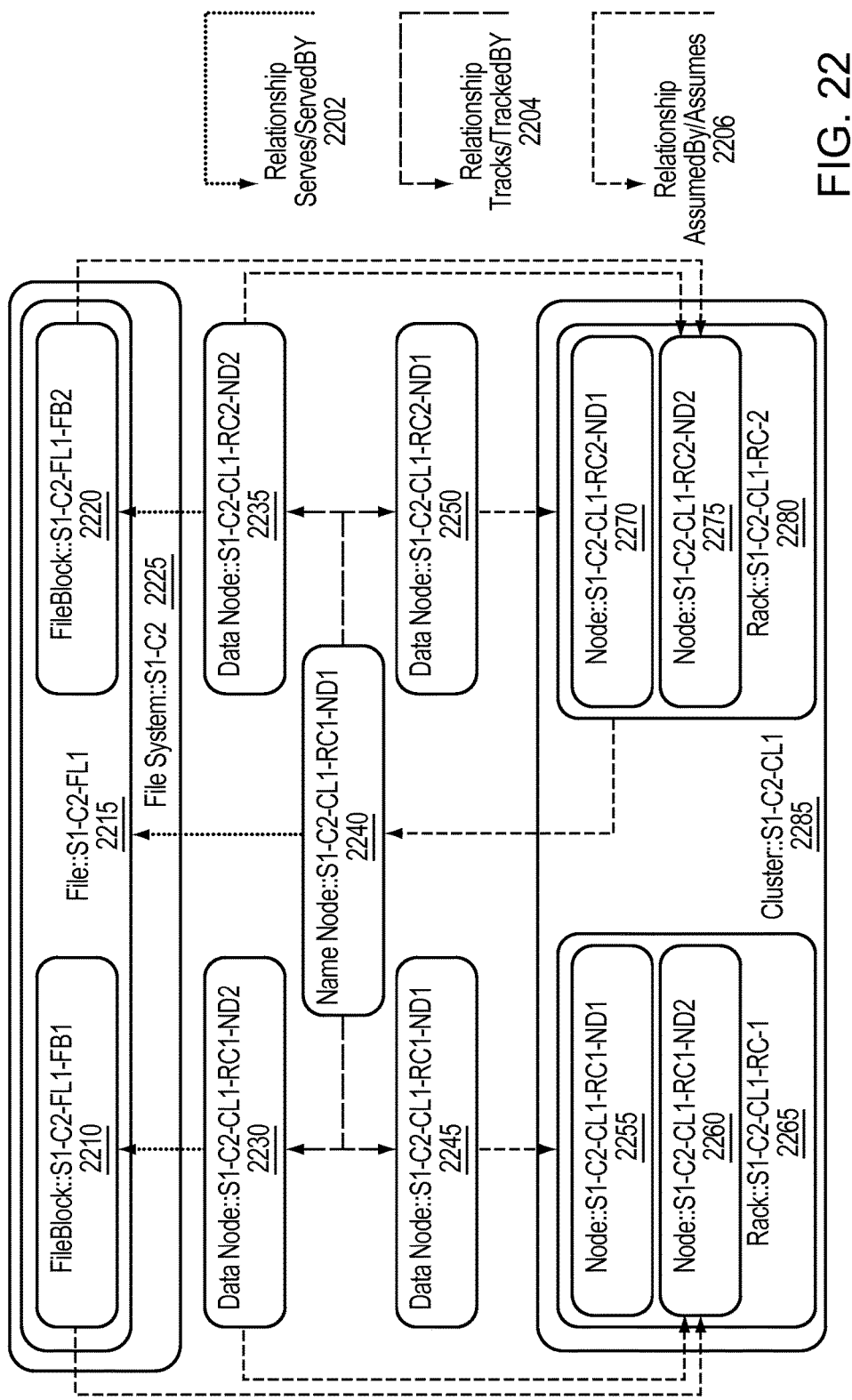
FIG. 22 is a simplified illustration representing illustrates a sample relationship between File, Architecture, and Role, in accordance with an embodiment of the present disclosure.

Refer now to the example embodiment of FIG. 22, which illustrates a sample relationship between File, Architecture, and Role. In the example embodiment of FIG. 22. Cluster 2285 contains racks 2265 and Rack 2280. Each rack contains nodes, such as nodes 2260, 2255 for rack 2265. Node 2260 assumes data node 2230 and file node 2210. Node 2255 assumes node 2245. Node 2270 assumes name node 2240. Node 2270 assumes Data node 2250. Node 2275 assumes Data node 2235 and file node 2220. Name node 2240 is tracked by data nodes 2230, 2235, 2240, 2245. File Block 2210 is tracked by data node 2230. File block 2220 is tracked by data node 2235. Name node 2240 is Served by File 2215.

In certain embodiments, Hadoop may function at the level of a Cluster. In some embodiments, WW Hadoop may create a layer on top of that, that may manage the same information that the Hadoop Distributed File System manages at the World Wide Level.

In certain embodiments, WWHDFS may manages WW Name Node And WW Data Node. In some embodiments, WW Data Node (Workers) may function as a Proxy to Name Nodes, acting in a World Wide role, on behalf of the Name Nodes. In certain embodiments, Workers may store and retrieve files upon request, by interacting with Name Nodes. In further embodiments, Workers may report status to WW Name Node on a periodic basis, indicating the list of files that the associated Name Nodes are managing. In at least some embodiments, Workers may maintain a tree for the Domain/File for which it has Files managed by the associated Name Nodes, and the metadata associated with the Domain/File. In certain embodiments, Workers may maintain Domain space and edit log files for the domain.

In some embodiments, WW Name Node (Master) may manage the Domain System name space. In certain embodiments, Master nodes may maintain Domain System Tree (members). In further embodiments, Master nodes may maintain the information necessary for mapping Domain and the WW Data Nodes where they reside. In other embodiments, Master nodes may manage the metadata for all files and directories in the Domain tree. In at least some embodiments, Master nodes may maintain namespace image and edit log files.

Figure 16:
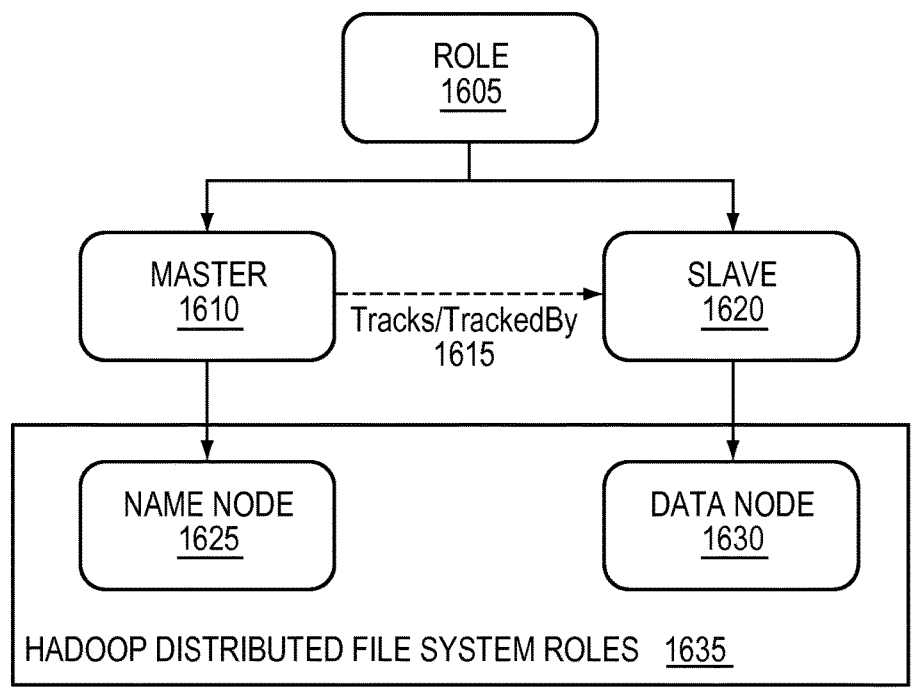
FIG. 16 is a simplified illustration representing an overlay of FIG. 15 onto Hadoop Distributed File System, in accordance with an embodiment of the present disclosure.
Figure 23:
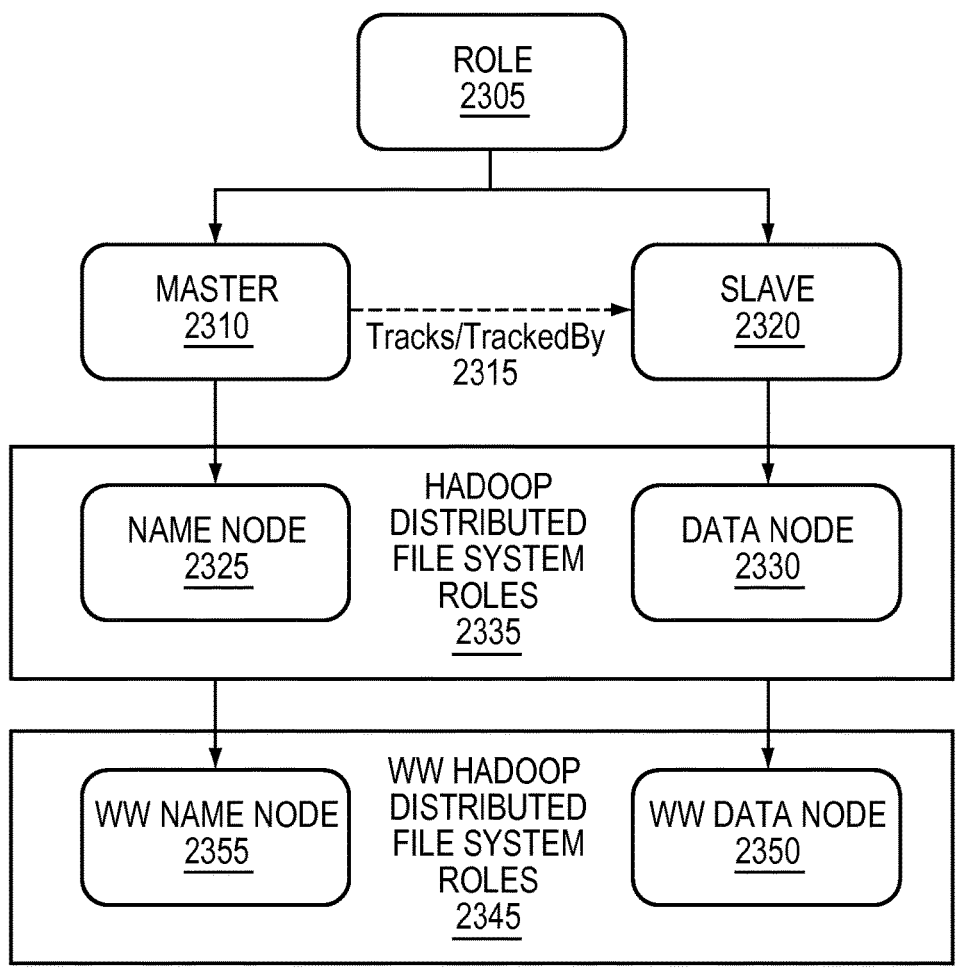
FIG. 23 is a simplified illustration representing an overlay of FIG. 16 onto WW Hadoop Distributed File System Roles, in accordance with an embodiment of the present disclosure.

Refer now to the example embodiment of FIG. 23, which overlays FIG. 16 onto WW Hadoop Distributed File System Roles 2335. WW Name node 2355 extends Name Node 2323. WW Data Node 2350 extends Data Node 2330.

In certain embodiments, the presence of a WW Data Node may turn a Cluster into a Cloud. In other embodiments, the WW Data Node may cause the Cluster to become a Data Node in the Sky. In other embodiments, it may make the Cluster a WW Data Node. In some embodiments, there may be at least one WW Data Node per Cloud. In other embodiments, when there is more than one data, one node may be selected as the primary and the nodes as secondary. In certain embodiments, this may mean that the primary is responsible to handle all functions of a Data Node while the others are back up in case of failures. In further embodiments, a relationship "Tracks" may be created between the WW Data Node and the Name Node in the Cluster. In certain embodiments, this binding (connection) may enable the WW Data Node to have the ability to have access to all the "files" managed by the Name Node.

In certain embodiments, the WW Data Node may become the point of access to entities outside the cluster to all the data residing in the Cluster. In other embodiments, the presence of a WW Data Node in a Cluster may turns that Cluster in a Cloud. In certain embodiments, the WW Data Node may turn the Cluster into a WW Data Node. In other embodiments, the Cluster may be a Data Node of the Cloud. In further embodiments, the Files may be managed by the Cluster as part of a Domain. In at least one embodiment, a WW Name Node may turn a Cloud or a collection of Clouds into a Sky. In further embodiments, a WW Name Node functions may function similarly to a Name Node, outside of a Cluster. In at least some embodiments, a WW Name Node may need. to have a "Tracks" relationship with WW Data Nodes.

Figure 24:
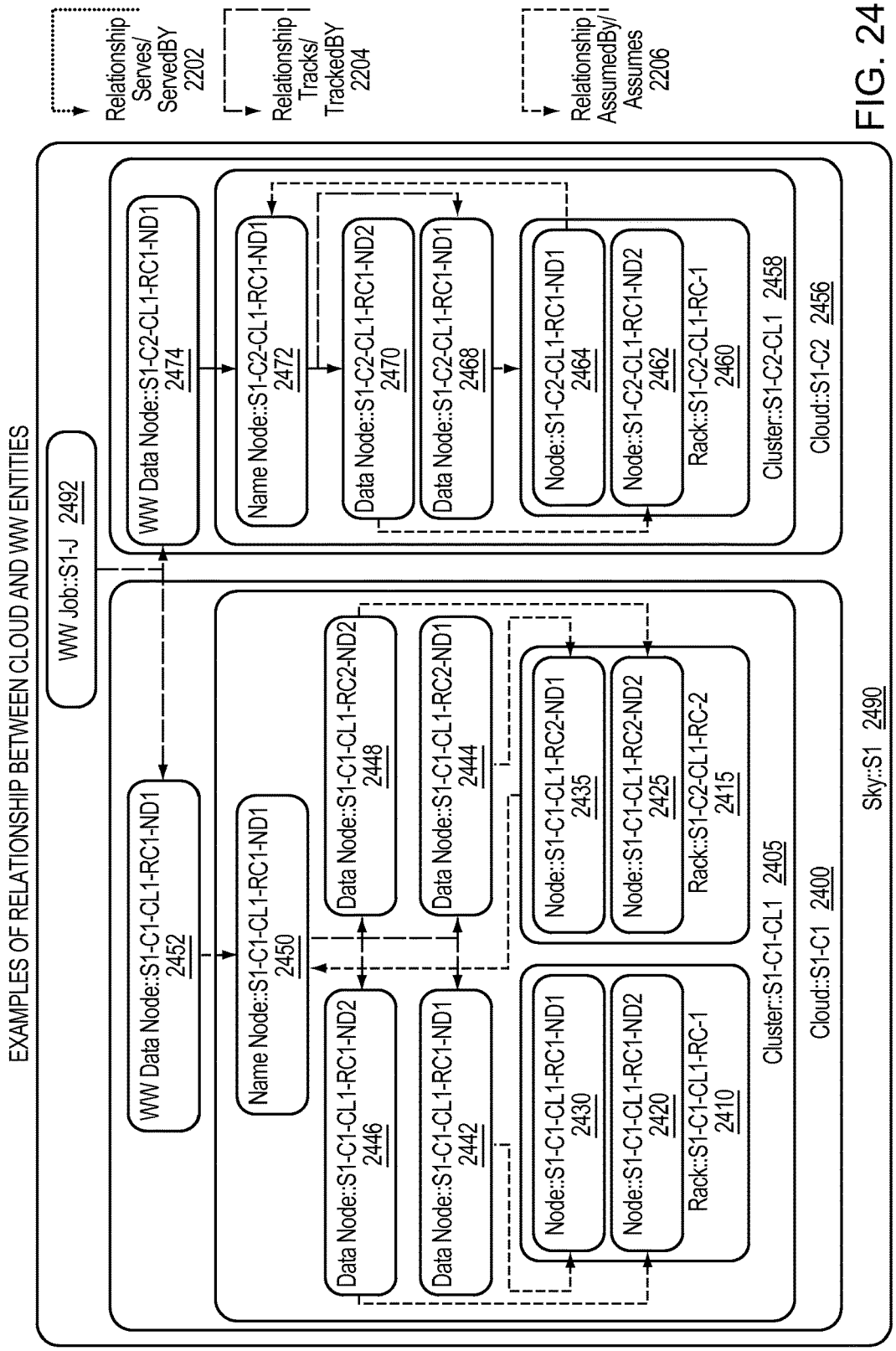
FIG. 24 is a simplified illustration representing a sample relationship between Cloud and WW entities, in accordance with an embodiment of the present disclosure.

Refer now to the example embodiment of FIG. 24, which illustrates a sample relationship between Cloud and WW entities. Sky 2490 contains two clouds, cloud 2465 and cloud 2400, and WW JOB 2492. Cloud 2400 contains of Cluster 2405 and WW Data node 2453. Cluster 2405 contains of four data nodes, 2442, 2444, 2446, and 2446. Cluster 2405 also contains name node 2450. Cluster 2405 also contains racks 2410 and 2415. Each rack, such as 2410 contains nodes, such as nodes 2420 and 2430. Data node 2446 is assumed by node 2420. Data node 2442 is assumed by node 2430. Data node 2448 is assumed by node 2425. Data node 2444 is assumed by node 2435. Node 2435 is assumed by name node 2450. Data node 2446 tracks data node 2448 and vice versa. Data node 2442 tracks data node 2444 and vice versa. WW Data node 2452 tracks Name node 2450

Cloud 2456 contains cluster 2458 which contains name node 2472 and WW Data Node 2474. WW Data node 2474 is tracked by WW Data node 2452 and vice versa. WW Data Node 2453 and WW data node 2474 are tracked by WW Job 2492. Cluster 2558 has name node 2472, data node 2470, and data node 2468, and rack 2460. Rack 2460 has node 2464 and node 2462. Name node 2472 is tracked by WW data node 2474. Data node 2470 and data node 2468 are tracked by name node 2472. Name node 2472 is tracked by node 2464. Node 2462 is tracked by data node 2470.

Figure 25:
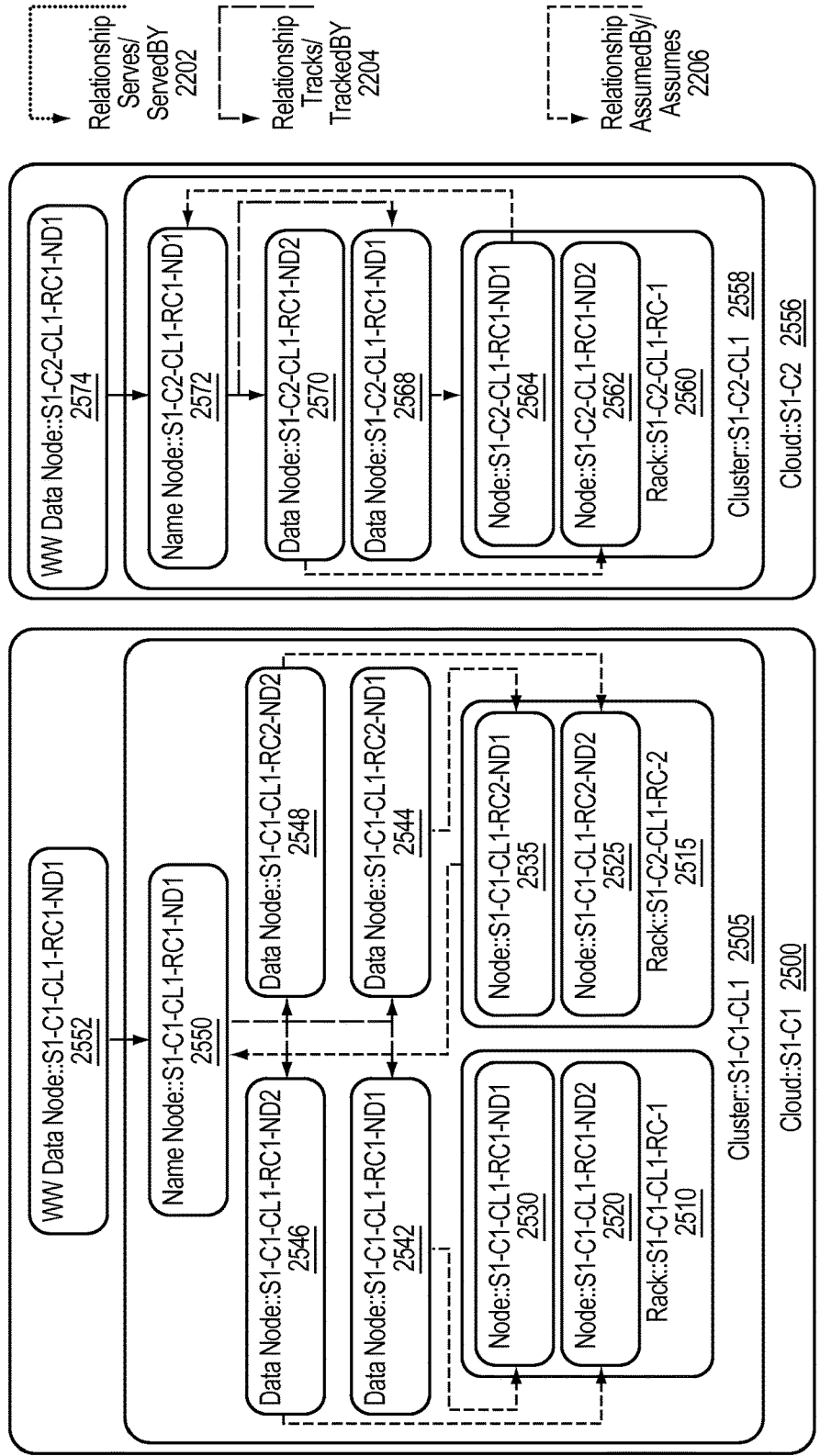
FIG. 25 is a simplified illustration representing illustrates a sample relationship between Cluster and Cloud (WW entity), in accordance with an embodiment of the present disclosure.

Refer now to the example embodiment of FIG. 25, which illustrates a sample relationship between Cluster and Cloud (WW entity). FIG. 25 layers a sky 2490 over FIG. 24 where WW job 2492 tracks WW data node 2452 and WW Data Node 2474.

In some embodiments, in the context of WW Map Reduce: the WW Data Node may becomes the "Master" of the Name Node. In at least some embodiments, the Name Node may become the Slave of the WW Data Node. In further embodiments, the WW Data Node may be a Slave of the WW Name Node and a Master of the Name Node. In other embodiments, the Name Node may be Master of the Data Node and Slave of the WW Data Node.

Figure 26:
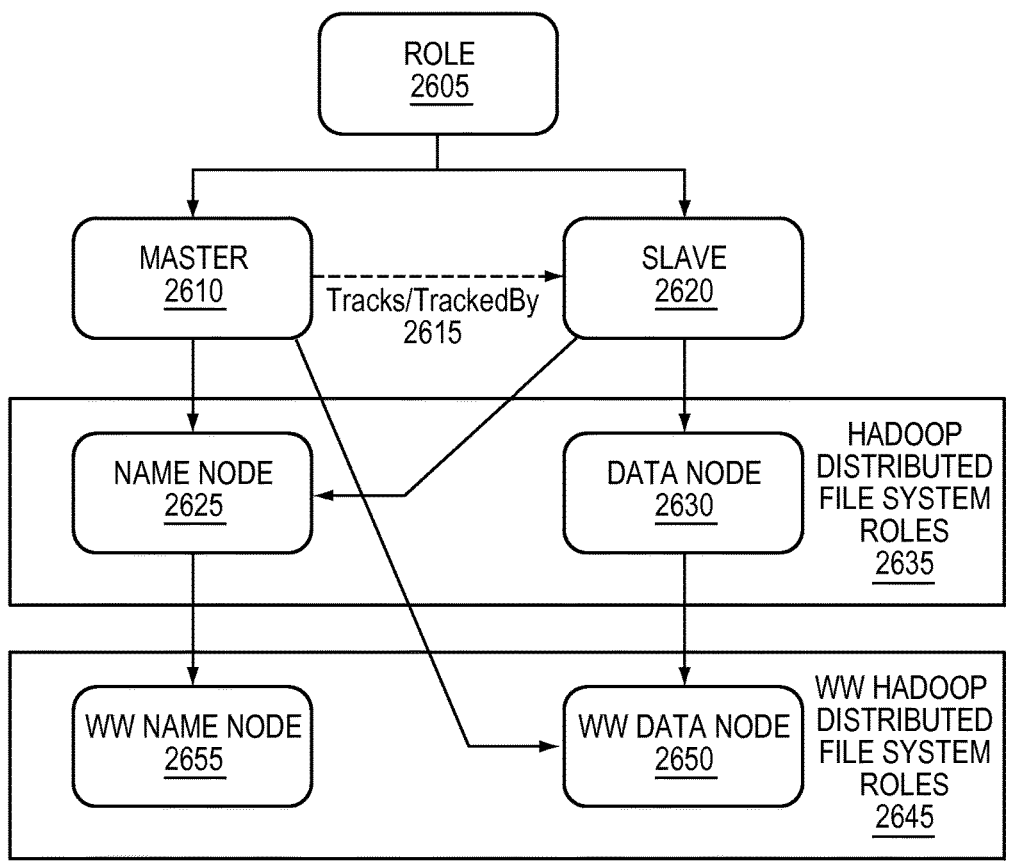
FIG. 26 is a simplified illustration representing a sample abstract classes which may define the root of the roles model hierarchy for WWHDFS, in accordance with an embodiment of the present disclosure.

Refer now to the example embodiment of FIG. 26, which illustrates a sample abstract classes which may define the root of the roles model hierarchy for WWHDFS. RTole 2605 is tracked by master 2610 and slave 2620. Slave 2620 is derived from and inherits the functionally of Master 1610. Hadoop distributed file system roles 2635 has name node 2624 and data node 2630. Data node 2630 is tracked by slave 2620. Name node 2625 is tracked by master 2610. WW Hadoop Distributed File System roles 2645 has WW name node 2655 and WW data node 2650. WW name node 2655 is tracked by name node 2625. WW data node 2650 is tracked by data node 2630. WW data node is tracked by ww data node 2650. Name node 2625 is tracked by slave 2620.

In certain embodiments, a Cloud may consist of many clusters. In some embodiments, a WW Data Node may become a "portal" for many clusters that are located in close proximity, with high speed connections. In at least some embodiments, the WW Data Node may track the Data Node of the Clusters in the same Cloud. In further embodiments, the Files in the Clusters that are part of a Cloud may be available through the WW Data Node to any Domain in which the Cloud participates.

Figure 27:
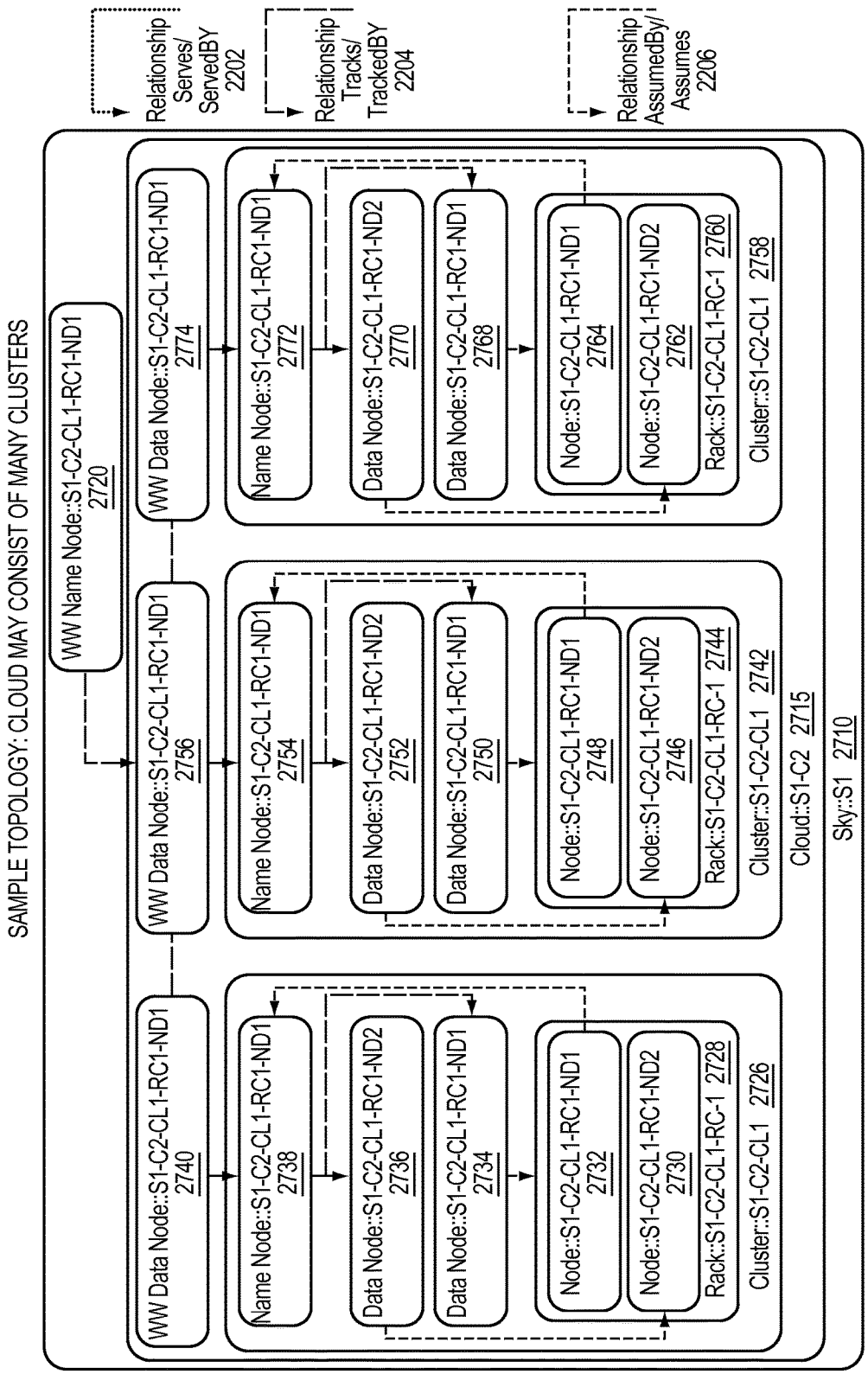
FIG. 27 is a simplified illustration representing a sample topology of a cloud with multiple clusters, in accordance with an embodiment of the present disclosure.

Refer now to the example embodiment of FIG. 27, which illustrates a sample topology of a cloud with multiple clusters. Sky 2710 contains Cloud 2715 and WW Name node 2720. Cloud 2715 contains WW data node 2740, WW data node 2756, WW data node 2774, cluster 2726, cluster 2742 and cluster 2758. Cluster 2758 contains name node 2772 and WW Data Node 2774. WW Data node 2774 is tracked by WW Data node 2752 and vice versa. WW Data Node 2453 and WW data node 2474 are tracked by WW Job 2492. Cluster 2558 has name node 2472, data node 2470, and data node 2768, and rack 2760. Tack 2760 has node 2764 and node 2762. Name node 2772 is tracked by WW data node 2774. Data node 2770 and data node 2768 are tracked by name node 2772. Name node 2772 is tracked by node 2764. Node 2762 is tracked by data node 2770. Cluster 2726 and Cluster 2742 contain similar elements and relationships as cluster 2758. WW data node 2740 tracks cluster 2726 via name node 2738. WW data node 2756 tracks cluster 2742 via name node 2754. WW data node 2744 tracks cluster 2758 vi name node 2772.

In some embodiments a WW Name Node may serve a Domain, while Name Node may serve a File. In other embodiments, a WW Name Node may track WW Data Nodes. In at least some embodiments, a WW Data Nodes may track Name Nodes, and Name Nodes may track Data Nodes.

Figure 28:
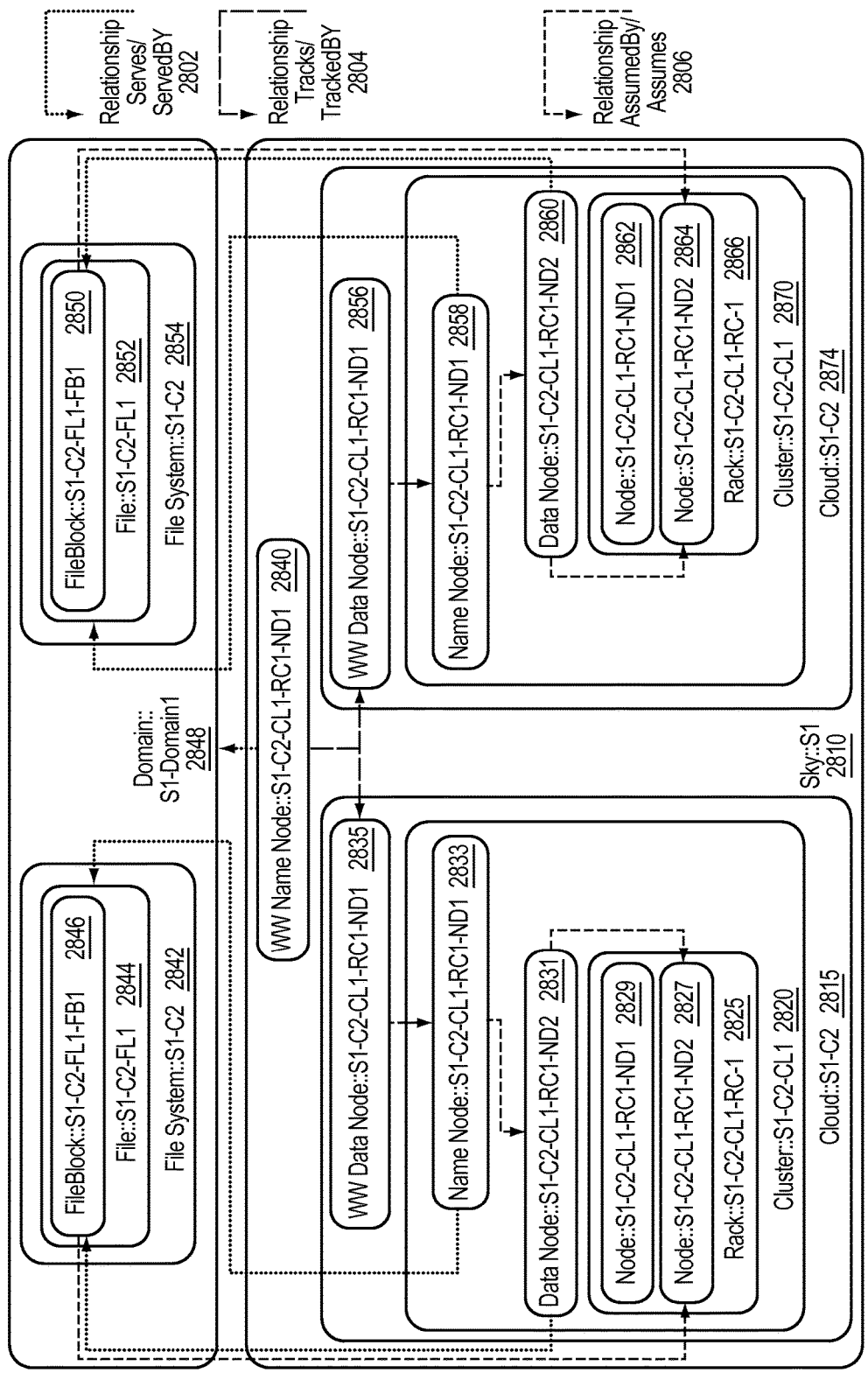
FIG. 28 is a simplified illustration representing sample mappings between clusters and clouds, in accordance with an embodiment of the present disclosure.

Refer to the example embodiment of FIG. 28. In the example embodiment of FIG. 28, domain 2848 is mapped to cluster 2820 and cluster 2870 of cloud 2815 and cloud 2874, respectively. Domain 2848 has file system 2842 and file system 2854. File system 2842 has file 2844, which in turn has file block 2846. File system 2854 has file 2852, which in turn has file block 2850.

File block 2846 has a relationship which serves node 2827. Data node 2831 tracks file block 2846. Name node 2833 serves file 2844. Data node 2831 is assumed by node 2827. WW Data node tracks name node 2833. Name node 2833 tracks data node 2831. WW name node 2840 serves domain 2848.

Figure 29:
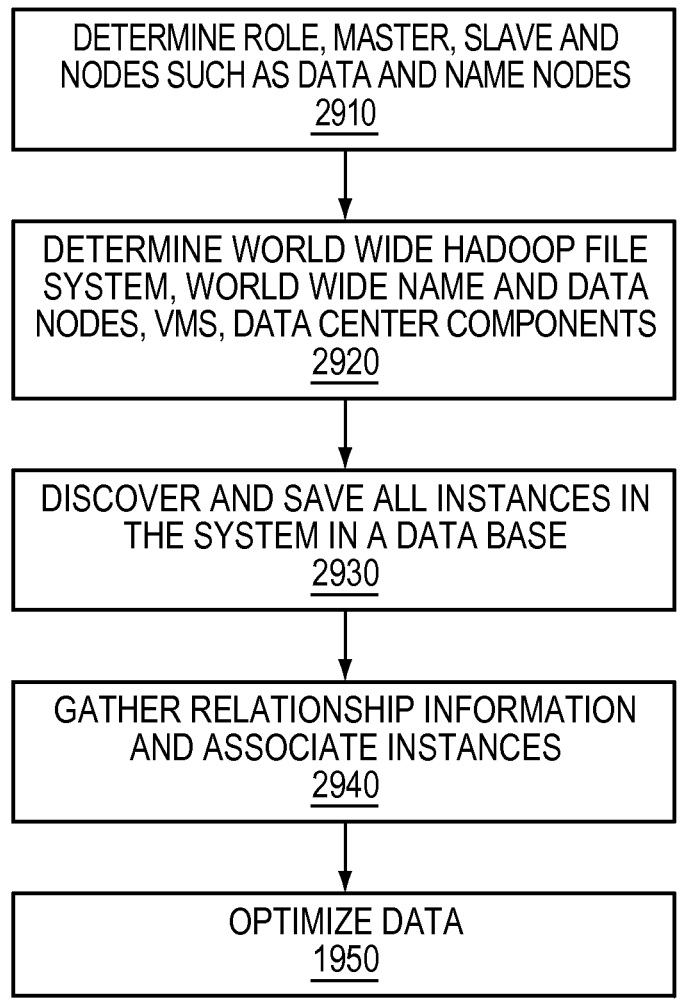
FIG. 29 is a simplified method for useful in transforming elements of a data set, such as outlined in FIG. 19, to a model representation such as outlined in FIG. 20 representing, in accordance with an embodiment of the present disclosure.

Refer now to the example embodiment of FIG. 29. The example embodiment of FIG. 13 may be useful in transforming elements of a data set, such as outlined in FIG. 19, to a model representation such as outlined in FIG. 20. In this embodiment, for a big data set, the roles of master, slaves, and nodes, such as data and name is determined (step 2910).

The World Wide Hadoop file system, worldwide name and data nodes, virtual machines, and data center components are determined (step 2920). The instances in the file system are discovered and saved in a database (step 2930). Relationship information and associate instances are gathered (step 2940). The data is optimized (step 2950).

Figure 30:
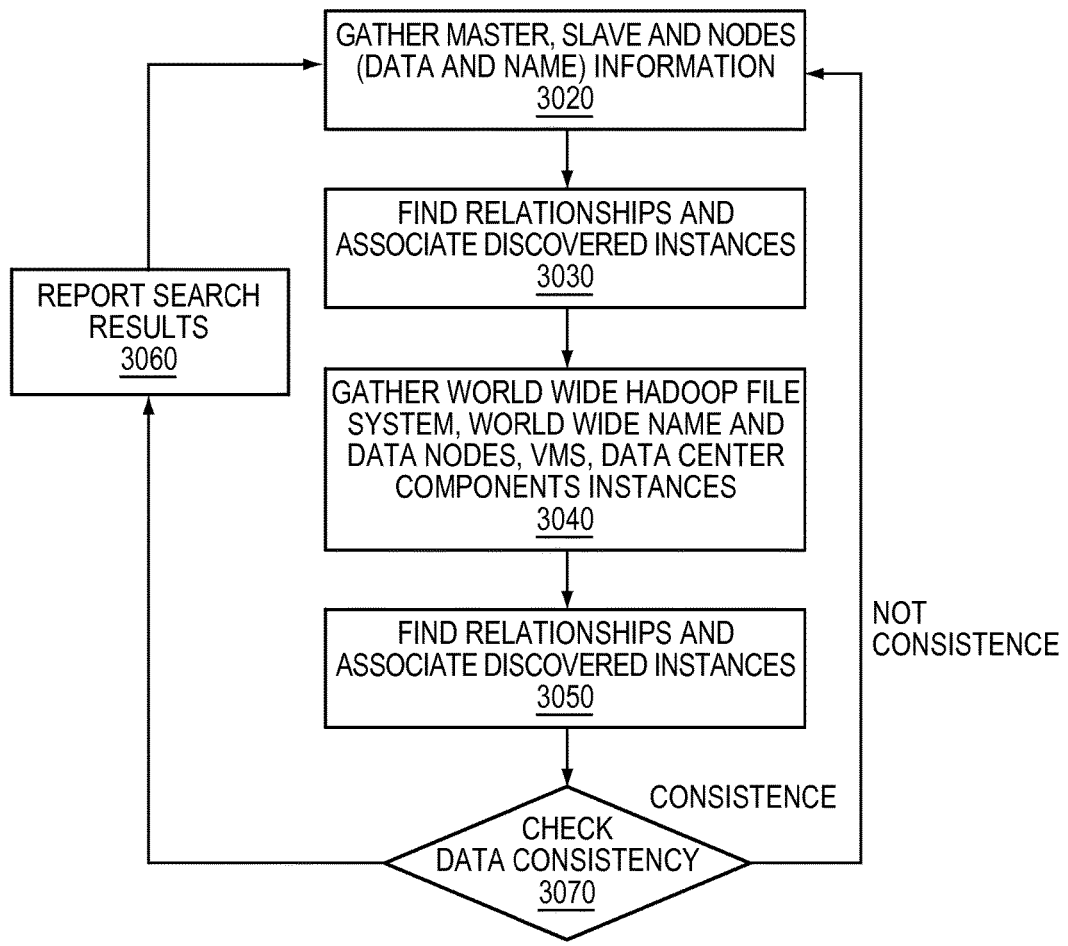
FIG. 30 is an alternative simplified method for useful in transforming elements of a data set, such as outlined in FIG. 19, in accordance with an embodiment of the present disclosure.

Refer now with the example embodiment of FIG. 30. The example embodiment of FIG. 13 may be useful in transforming elements of a data set, such as outlined in FIG. 19, to a model representation such as outlined in FIG. 20. In this example embodiment, master, slave, and data and name node information is gathered (step 3020). Relationships are found and discovered instances are associated (step 3030). Worldwide Hadoop file system, worldwide name and data nodes, virtual machines, and data center components are gathered (step 3040). Relationships are found and discovered instances are associated (step 3040). Search results are reported and steps 3020-3050 may be repeated (step 3060). Data consistency is checked (step 3070). If the data is not consistent steps 3020-3050 may be repeated.

Figure 31:
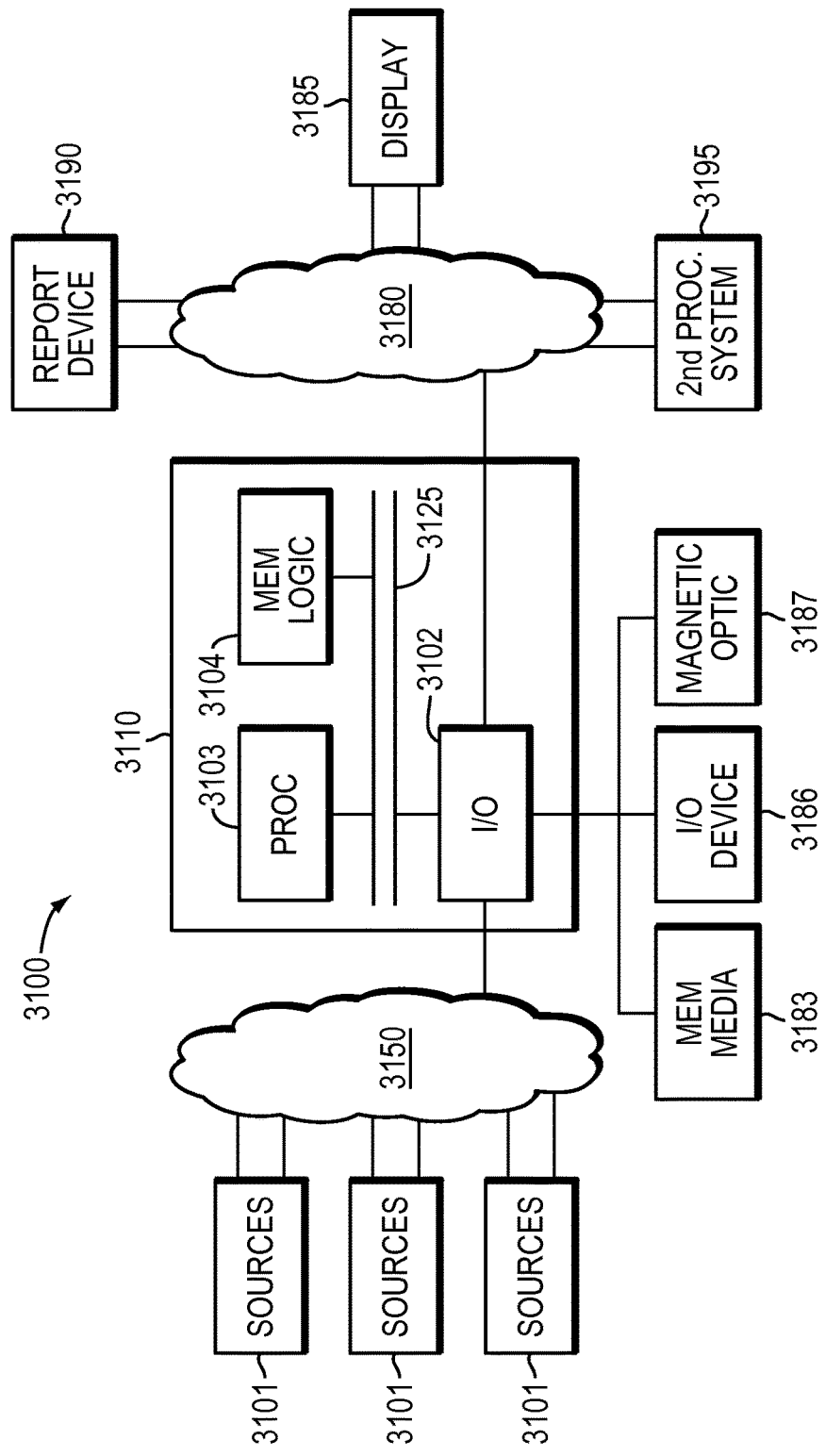
FIG. 31 is an example of an embodiment of an apparatus that may utilize the techniques described herein, in accordance with an embodiment of the present disclosure.
Figure 32:
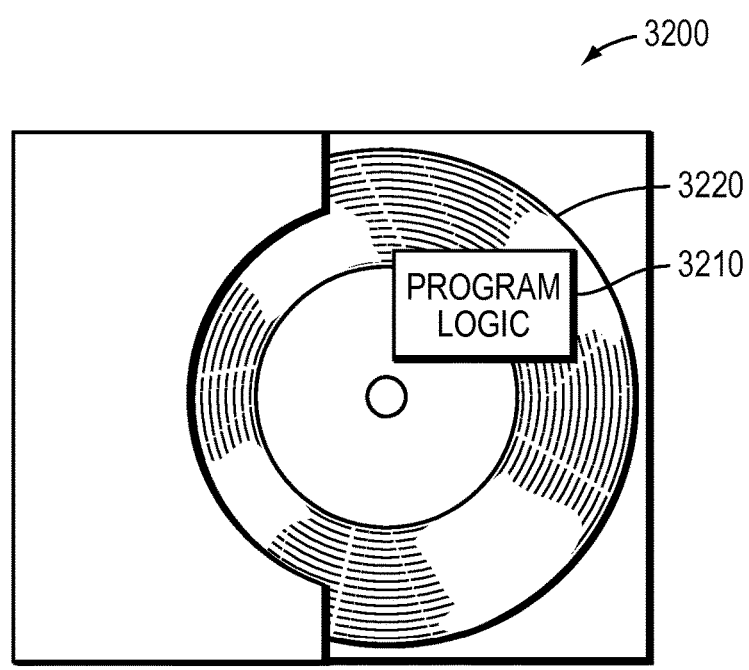
FIG. 32 is an example of an embodiment of a method embodied on a computer readable storage medium that may utilize the techniques described herein, in accordance with an embodiment of the present invention.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 31, the machine becomes an apparatus for practicing the invention. When implemented on one or more general-purpose processors, the program code combines with such a processor 3103 to provide a unique apparatus that operates analogously to specific logic circuits. As such a general purpose digital machine can be transformed into a special purpose digital machine. FIG. 32 shows Program Logic 3234 embodied on a computer-readable medium 3230 as shown, and wherein the Logic is encoded in computer-executable code configured for carrying out the reservation service process of this invention and thereby forming a Computer Program Product 3200. The logic 3134 may be the same logic 3140 on memory 3104 loaded on processor 3103. The program logic may also be embodied in software modules, as modules, or as hardware modules.

The logic for carrying out the method may be embodied as part of the system described below, which is useful for carrying out a method described with reference to embodiments shown in, for example, FIG. 12 and FIG. 15. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer implemented method for generating a file system for use in distributed storage systems, the method comprising:
    determining a set of objects from a big data cloud architecture to be represented in a computer model implemented on one or more computers; wherein the determining the set of objects includes determining architecture sets; wherein the architecture sets are enabled to comprise racks, clusters, and nodes;
    determining the relationships between the set of objects of the big data cloud architecture to be represented in the computer model; wherein determining the relationships between the set of objects includes determining the role of the determined set of objects including existence of master and slave relationships;
    creating representations in the computer model of the set of objects of the big data cloud architecture and relationships between the objects of the set of objects of the big data cloud architecture by defining representations of the set of objects and relationships between the objects in the computer model to transform a portion of the big data cloud architecture into the computer model; wherein at least one of the representations is transformed from a data set representing the big data cloud architecture; wherein representations include big data cloud architecture representations and role representations between the representations of the big data cloud architecture;
    determining a worldwide Hadoop file system that extends over a plurality of Hadoop clusters, the Hadoop clusters being created based on representations of the big data cloud architecture, the worldwide Hadoop file system being determined based on a worldwide Hadoop mapping, that maps out the Hadoop clusters into the file system, the worldwide Hadoop mapping being determined based on the big data cloud architecture and a big data cloud processing methodology, wherein the big data cloud processing methodology manages data flow and data analysis of the big data cloud architecture; and
    using the worldwide Hadoop file system to perform at least one of scattering, replicating, or managing data in the Hadoop clusters.

2. The method of claim 1 further comprising:
    creating representations in the computer model of one or more skies, clouds, and data centers;
    creating representations in the computer model of one or more file systems, files, and file system blocks;
    creating layered over relationships between the one or more file system blocks and the representations of the one or more nodes; and
    creating layered over representations of the one or more files over the one or more clouds.

3. The method of claim 2 further comprising:
    creating representations in the computer model of one or more master nodes, slave nodes, and data nodes;
    creating tracked by relationship representations between the one or more name nodes and the one or more data nodes;
    creating assumed by relationship representations between the one or more file system blocks and the one or more nodes; and
    creating served by relationship representations between the one or more file system blocks and the one or more data nodes.

4. The method of claim 3 further comprising:
    creating assumed by relationship representations between the one or more nodes and the one or more data nodes; and
    creating tracked by relationship representations between the one or more name nodes and the one or more nodes.

5. The method of claim 2 further comprising:
creating assumed by relationship representations between the one or more nodes and the one or more file system blocks;
creating assumed by relationship representations between the one or more name nodes and the one or more nodes;
creating assumed by relationship representations between the one or more nodes and the one or more data nodes;
creating tracked by relationship representations between the one or more data nodes and the one or more name nodes;
creating assumed by relationship representations between the one or more nodes and the one or more data nodes;
creating served by relationship representations between the one or more file system blocks and the one or more data nodes;
creating served by relationship representations between the one or more files and the one or more name nodes.

6. The method of claim 2 further comprising:
creating layered over relationships between the one or more clouds and the representations of the one or more files; and
creating layered over relationships between the one or more nodes and the representations of the one or more file system blocks.

7. A computer program product for generating a file system for use in distributed storage systems, the computer program product comprising:
a non-transitory computer readable medium comprising computer executable program code for replication of data, the code configured to enable the execution across one or more processors of:
determining a set of objects from a big data cloud architecture to be represented in a computer model implemented on one or more computers; wherein the determining the set of objects includes determining architecture sets; wherein the architecture sets are enabled to comprise racks, clusters, and nodes;
determining the relationships between the set of objects of the big data cloud architecture to be represented in the computer model; wherein determining the relationships between the set of objects includes determining the role of the determined set of objects including existence of master and slave relationships;
creating representations in the computer model of the set of objects of the big data cloud architecture and relationships between the objects of the set of objects of the big data cloud architecture by defining representations of the set of objects and relationships between the objects in the computer model to transform a portion of the big data cloud architecture into the computer model; wherein at least one of the representations is transformed from a data set representing the big data cloud architecture; wherein representations include big data cloud architecture representations and role representations between the representations of the big data cloud architecture;
determining a worldwide Hadoop file system that extends over a plurality of Hadoop clusters, the Hadoop clusters being created based on representations of the big data cloud architecture, the worldwide Hadoop file system being determined based on a worldwide Hadoop mapping that maps out the Hadoop clusters into the file system, the worldwide Hadoop mapping being determined based on the big data cloud architecture and a big data cloud processing methodology, wherein the big data cloud processing methodology manages data flow and data analysis of the big data cloud architecture; and
using the worldwide Hadoop file system to perform at least one of scattering, replicating, or managing data in the Hadoop clusters.

8. The computer program product of claim 7 wherein the code further enables execution of:
creating representations in the computer model of one or more skies, clouds, and data centers;
creating representations in the computer model of one or more file systems, files, and file system blocks;
creating layered over relationships between the one or more file system blocks and the representations of the one or more nodes; and
creating layered over representations of the one or more files over the one or more clouds.

9. The computer program product of claim 8 wherein the code further enables execution of:
creating representations in the computer model of one or more master nodes, slave nodes, and data nodes;
creating tracked by relationship representations between the one or more name nodes and the one or more data nodes;
creating assumed by relationship representations between the one or more file system blocks and the one or more nodes; and
creating served by relationship representations between the one or more file system blocks and the one or more data nodes.

10. The computer program product of claim 9 wherein the code further enables execution of:
creating assumed by relationship representations between the one or more nodes and the one or more data nodes
creating tracked by relationship representations between the one or more name nodes and the one or more nodes; and
creating assumed by relationship representations between the one or more nodes and the one or more data nodes.

11. The computer program product of claim 9 wherein the code further enables execution of:
creating assumed by relationship representations between the one or more nodes and the one or more file system blocks;
creating assumed by relationship representations between the one or more name nodes and the one or more nodes;
creating assumed by relationship representations between the one or more nodes and the one or more data nodes;
creating tracked by relationship representations between the one or more data nodes and the one or more name nodes;
creating assumed by relationship representations between the one or more nodes and the one or more data nodes;
creating served by relationship representations between the one or more file system blocks and the one or more data nodes; and
creating served by relationship representations between the one or more files and the one or more name nodes.

12. The computer program product of claim 9 wherein the code further enables execution of:
creating layered over relationships between the one or more clouds and the representations of the one or more files; and
creating layered over relationships between the one or more nodes and the representations of the one or more file system blocks.

13. An apparatus for generating a file system for use in distributed storage systems, the apparatus comprising:
one or more processors;
computer executable program code for replication of data, the code configured to enable the execution across the one or more processors of:
determining a set of objects from a big data cloud architecture to be represented in a computer model implemented on one or more computers; wherein the determining the set of objects includes determining architecture sets; wherein the architecture sets are enabled to comprise racks, clusters, and nodes;
determining the relationships between the set of objects of the big data cloud architecture to be represented in the computer model; wherein determining the relationships between the set of objects includes determining the role of the determined set of objects including existence of master and slave relationships;
creating representations in the computer model of the set of objects of the big data cloud architecture and relationships between the objects of the set of objects of the big data cloud architecture by defining representations of the set of objects and relationships between the objects in the computer model to transform a portion of the big data cloud architecture into the computer model; wherein at least one of the representations is transformed from a data set representing the big data cloud architecture;
wherein representations include big data cloud architecture representations and role representations between the representations of the big data cloud architecture;
determining a worldwide Hadoop file system that extends over a plurality of Hadoop clusters, the Hadoop clusters being created based on representations of the big data cloud architecture, the worldwide Hadoop file system being determined based on a worldwide Hadoop mapping that maps out the Hadoop clusters into the file system, the worldwide Hadoop mapping being determined based on the big data cloud architecture and a big data cloud processing methodology, wherein the big data cloud processing methodology manages data flow and data analysis of the big data cloud architecture; and
using the worldwide Hadoop file system to perform at least one of scattering, replicating, or managing data in the Hadoop clusters.

14. The apparatus of claim 13 the code further configured to enable:
creating representations in the computer model of one or more skies, clouds, and data centers;
creating representations in the computer model of one or more file systems, files, and file system blocks;
creating layered over relationships between the one or more file system blocks and the representations of the one or more nodes; and
creating layered over representations of the one or more files over the one or more clouds.

15. The apparatus of claim 14 the code further configured to enable:
creating representations in the computer model of one or more master nodes, slave nodes, and data nodes;
creating tracked by relationship representations between the one or more name nodes and the one or more data nodes;
creating assumed by relationship representations between the one or more file system blocks and the one or more nodes; and
creating served by relationship representations between the one or more file system blocks and the one or more data nodes.

16. The apparatus of claim 15 the code further configured to enable:
creating assumed by relationship representations between the one or more nodes and the one or more data nodes;
creating tracked by relationship representations between the one or more name nodes and the one or more nodes; and
creating assumed by relationship representations between the one or more nodes and the one or more data nodes.

17. The apparatus of claim 15 the code further configured to enable:
creating assumed by relationship representations between the one or more nodes and the one or more file system blocks;
creating assumed by relationship representations between the one or more name nodes and the one or more nodes;
creating assumed by relationship representations between the one or more nodes and the one or more data nodes;
creating tracked by relationship representations between the one or more data nodes and the one or more name nodes;
creating assumed by relationship representations between the one or more nodes and the one or more data nodes;
a software module executing on one or more of the one or more processors for creating served by relationship representations between the one or more file system blocks and the one or more data nodes; and
creating served by relationship representations between the one or more files and the one or more name nodes.

18. The apparatus of claim 15 the code further configured to enable:
creating layered over relationships between the one or more clouds and the representations of the one or more files; and
creating layered over relationships between the one or more nodes and the representations of the one or more file system blocks.

\* \* \* \* \*